(12) United States Patent
Chaudhari et al.

(10) Patent No.: US 11,258,589 B2
(45) Date of Patent: Feb. 22, 2022

(54) METHODS AND SYSTEMS FOR CRYPTOGRAPHIC KEYS EXCHANGE

(71) Applicant: MASTERCARD INTERNATIONAL INCORPORATED, Purchase, NY (US)

(72) Inventors: Ritesh Chaudhari, Pune (IN); Ashish Dhande, Nashik (IN); Ashish Patel, Pune (IN); Chetan Bhalerao, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 150 days.

(21) Appl. No.: 16/737,693

(22) Filed: Jan. 8, 2020

(65) Prior Publication Data

US 2020/0220719 A1 Jul. 9, 2020

(30) Foreign Application Priority Data

Jan. 9, 2019 (SG) .............................. 10201900198S

(51) Int. Cl.
*H04L 9/08* (2006.01)
*H04L 9/32* (2006.01)
*H04L 29/06* (2006.01)
*H04L 9/16* (2006.01)

(52) U.S. Cl.
CPC .......... *H04L 9/0825* (2013.01); *H04L 9/0822* (2013.01); *H04L 9/0866* (2013.01); *H04L 9/0869* (2013.01); *H04L 9/0877* (2013.01); *H04L 9/0891* (2013.01); *H04L 9/16* (2013.01); *H04L 9/3242* (2013.01);
(Continued)

(58) Field of Classification Search
CPC ... H04L 9/0825; H04L 9/3242; H04L 9/0869; H04L 9/0822; H04L 63/0428; H04L 9/0877; H04L 9/0891; H04L 9/0866; H04L 9/3247; H04L 9/16; H04L 2209/24; H04L 2209/56; H04L 9/0662; H04L 9/0841; H04L 63/083; H04L 2463/061; H04L 63/0853; H04L 2463/062; H04L 63/12; H04L 63/0823; H04L 63/062; G06Q 20/3829; G06Q 20/388
See application file for complete search history.

(56) References Cited

U.S. PATENT DOCUMENTS

| | | | | |
|---|---|---|---|---|
| 2010/0293379 | A1* | 11/2010 | Nie ........................ | H04W 12/10 713/169 |
| 2012/0216042 | A1* | 8/2012 | Brown ................... | H04L 9/3268 713/173 |
| 2015/0318995 | A1* | 11/2015 | Leggette .................. | H04L 9/14 713/181 |

* cited by examiner

*Primary Examiner* — Mohammed Waliullah
(74) *Attorney, Agent, or Firm* — Talem IP Law, LLP

(57) ABSTRACT

Embodiments provide methods, and systems for cryptographic keys exchange where the method can include receiving, by a server system, a client public key being part of a client asymmetric key pair from a client device; sending, by the server system, a server public key being part of a server asymmetric key pair to the client device; generating, by the server system, a random value master key and sending the random value master key encrypted using the client public key to the client device; and generating, by the server system, an initial unique session key and sending the initial unique session key encrypted under the random value master key to the client device. A unique session key from the set of the unique session keys is used by the client device to encrypt a session data for transmission to the server system per session.

18 Claims, 13 Drawing Sheets

(52) U.S. Cl.
CPC ........ *H04L 9/3247* (2013.01); *H04L 63/0428* (2013.01); *H04L 2209/24* (2013.01)

1100

METHODS AND SYSTEMS FOR CRYPTOGRAPHIC KEYS EXCHANGE

TECHNICAL FIELD

The present disclosure relates to cryptographic services facilitated in a client-server architecture and, more particularly to, methods and systems for cryptographic keys exchange using derived unique key per session.

BACKGROUND

Cryptography is a technique to securely send and receive data using encryption and decryption methods by ensuring secure communication over the network. For example, a web page should use encryption when it expects users to submit confidential data, including personal information, passwords, Personal Identification Numbers (PINs) or credit card details. An encryption key may be used to encrypt such data for transmission. Currently, when a customer enters the PIN on a Point of Sale (POS) terminal, the pin block gets encrypted with the encryption key, that is static for all the transactions on that terminal until the new key is generated. As per the standard regulations, such encryption keys are changed periodically e.g., every week or daily. Further, such keys are loaded manually into the terminals, which is an expensive and error-prone process. Further, the chances of encryption key theft get increased and the underlying data can be compromised.

The sender of the encryption key must convey to the receiver the specific encryption key which was used for encrypting the user data. Generally, the encryption key is protected during the transmittal process by one more layer of encryption using a master key. The master key must be generated, distributed, and loaded under greater security control. Because of the high level of security under which the master key is handled, the master key is typically used for longer periods of time that could extend into many months. The master key exchange between the entities is also done manually, for example, by mail or e-mail. In such arrangements, the master keys can get tampered and lost.

Accordingly, there is a need for techniques that enable secure, automatic and dynamic cryptographic keys exchange between the entities that communicate with each other. Also, there is a need to have a secure mechanism to authenticate the entities that communicate with each other as well as the message that is communicated.

BRIEF SUMMARY

Various embodiments of the present disclosure provide systems, methods, electronic devices and computer program products for cryptographic keys exchange.

In an embodiment, a computer-implemented method is disclosed. The method includes receiving, by a server system, a client public key being part of a client asymmetric key pair from a client device. The method includes sending, by the server system, a server public key being part of a server asymmetric key pair to the client device. Moreover, the method includes generating, by the server system, a random value master key. The method includes sending, by the server system, the random value master key encrypted using the client public key being part of the client asymmetric key pair to the client device. Furthermore, the method includes generating, by the server system, an initial unique session key. The method includes sending, by the server system, the initial unique session key encrypted under the random value master key to the client device to derive a set of unique session keys by the client device. A unique session key from the set of the unique session keys is used by the client device to encrypt a session data for transmission to the server system per session.

In another embodiment, a server system is provided. The server system includes a communication interface configured to receive a client public key being part of a client asymmetric key pair from a client device. The communication interface is further configured to send a server public key being part of a server asymmetric key pair to the client device. The server system includes a hardware security module configured to generate a random value master key. The hardware security module is further configured to generate an initial unique session key. The server system further includes a memory comprising executable instructions and a processor communicably coupled to the communication interface. The processor is configured to execute the instructions to cause the server system to at least send the random value master key encrypted using the client public key being part of the client asymmetric key pair to the client device. The processor is further configured to execute the instructions to cause the server system to send the initial unique session key encrypted under the random value master key to the client device to derive a set of unique session keys by the client device. A unique session key from the set of the unique session keys is used by the client device to encrypt a session data for transmission to the server system per session.

In yet another embodiment, a computer-implemented method is disclosed. The method includes generating, by a server system, an initial unique MAC key using a Key Serial Number (KSN) of a client device and a Base Derived Key (BDK) generated by a Hardware Security Module (HSM) associated with the server system. The method includes receiving, by the server system, a session data encrypted under a unique session key, a KSN with an incremented session counter and a Message Authentication Code (MAC) encrypted using a unique MAC key valid for a current session. The unique MAC key is selected from a set of unique MAC keys derived by the client device from the initial unique MAC key received from the server system. Moreover, the method includes validating, by the server system, the unique MAC key using the KSN with the incremented session counter and the BDK. Upon successful validation of the unique MAC key, the method includes decrypting, by the server system, the session data from the unique session key.

BRIEF DESCRIPTION OF THE DRAWINGS

For a more complete understanding of example embodiments of the present technology, reference is now made to the following descriptions taken in connection with the accompanying drawings in which.

Figure 1:
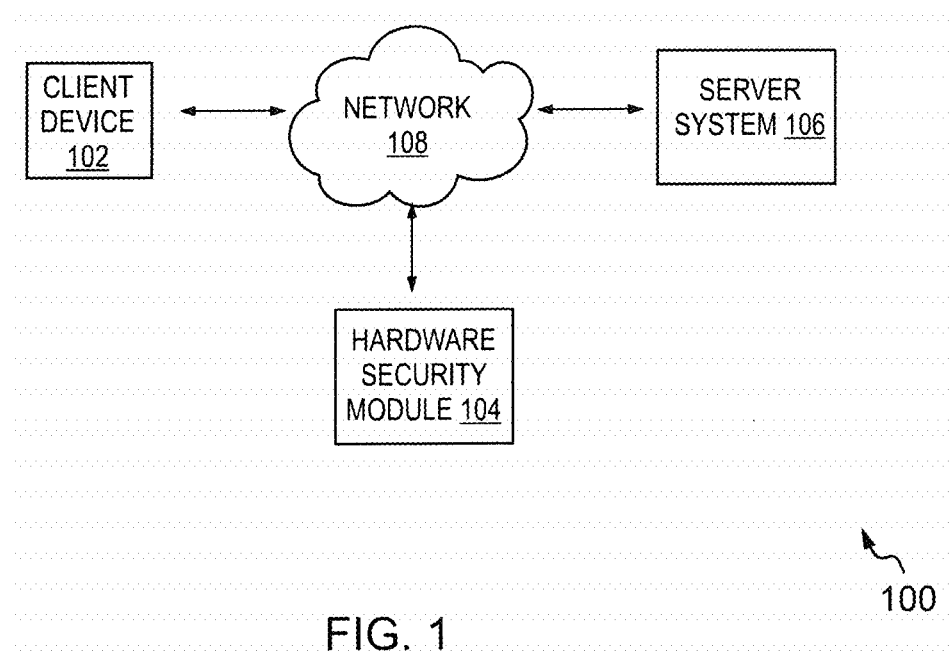
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices, and computer program products for auto-initiated dynamic cryptographic keys exchange based on asymmetric key encryption and derivation of unique session keys for encrypting session data to be sent from a client device to a server system. In cryptography, Derived Unique Key Per Transaction/session (DUKPT) is a key management scheme where a unique key derived from a fixed key is used for every transaction. Therefore, if the derived unique key is compromised, future and past transaction data are still protected since the next or prior keys cannot be determined easily.

In various example embodiments, the present disclosure facilitates sending by a server system an initial unique session key (an example of a fixed key) encrypted under a random value master key (hereinafter alternatively referred to as "master key") to a client device. The master key is generated by a Hardware Security Module (HSM) associated with the server system. Further, the master key is sent to the client device using asymmetric encryption. For instance, a client public key is sent by the client device to the server system for the successful encrypted master key exchange. The master key is encrypted using the client public key being part of a client asymmetric key pair. The master key is further certified by the server system by signing using a server private key being part of a server asymmetric key pair. The client device is configured to retrieve the master key using the client private key. Transmission of the public keys is certified by a trusted security model/certification authority.

The initial unique session key is generated from a Base Derived Key (BDK) generated by the HSM associated with the server system and a Key Serial Number (KSN) associated with the client device. The initial unique session key and the master key are loaded/sent to the client device prior to an initialization of a session/transaction between the client device and the server system.

The client device is configured to utilize the initial unique session key (i.e., the fixed key) received from the server system and the KSN to derive a set of unique session keys (i.e., the unique key). A unique session key from the set of the unique session keys is used by the client device to encrypt a session data for transmission to the server system per session. In an embodiment, the session data corresponds to any data entered by a user using an application such a web application or a mobile application (facilitated by the server system) running on the client device. Some non-exhaustive examples of the session data include a login ID, a password, a PIN, a Card Verification Value (CVV), payment card details, payment related data or any other data such as user personal information that is sensitive enough for a misuse by a third party if retrieved during transmission from the client device to the server system.

In one embodiment, the server system generates an initial unique Message Authentication Code (MAC) key (an example of the fixed key) based on a derived unique key per session (also known as Derived Unique Key per Transaction (DUKPT)) using the HSM associated with the server system. The initial unique MAC key is sent to the client device for deriving a set of unique MAC keys (i.e., the unique keys). A unique MAC key from the set of unique MAC keys is selected to encrypt the MAC for the current session. The MAC encrypted using the unique MAC key is sent to the server system along with the session data encrypted under the unique session key. The MAC is used to authenticate the client device as well as verifying if there is a tampering with the session data. The unique MAC key is validated by the server system and upon successful validation of the unique MAC key, the session data from the unique session key is decrypted/translated.

FIG. 1 illustrates an exemplary representation of an environment 100 related to at least some example embodiments of the present disclosure. In the illustrated environment 100, a client device 102 is shown. Examples of the client device 102 include, but are not limited to, a smartphone, a tablet, a personal digital assistant (PDA), a notebook, a POS terminal, a kiosk, an ATM or any electronic device having the capability to perform Derived Unique Key per Session/Transaction (DUKPT) based encryption to communicate with other devices via a network 108. For example, the client device 102 may be a computer including a web browser on which a server system 106 hosts a web application, such that the server system 106 (e.g., an application server of the web application) is accessible to the client device 102 using the Internet. For example, the web application may be a payment transaction application. Accessing the payment transaction application may redirect the client device 102 to establish a connection/session with the server system 106 for data communication. Alternatively, the client device 102 may be a POS terminal in a payment network configured to accept a user PIN (an example of the session data) and encrypt it before transmission to the server system 106 (e.g., an acquirer server) over the network 108.

The client device 102 is shown in operative communication with a Hardware Security Module (HSM) 104 and the server system 106 via the network 108. In some cases, the HSM 104 and the server system 106 can be a single entity i.e. embodied within a single server system. The HSM 104 and the server system 106 can be examples of a logical server system built on cloud computing platform. Alternatively, the HSM 104 and the server system 106 may be located at different facilities of entities managing them separately. In an embodiment, the HSM 104 is a tamper-resistant device.

The server system 106 can take the example of any server which is the administrative part of the application (not shown) and which stores data sent from the client device 102. In an example, the server system 106 may be associated with a financial institution such as an "issuer bank" or "issuing bank" or simply "issuer" or simply "bank", in which a user operating the client device 102 may have an issuer account. The server system 106 is responsible for managing information of the user. The server system 106 includes an issuer database (not shown) for maintaining information such as one or more issuer accounts of the user, transaction history related information, permanent account number (PAN) with which the one or more issuer accounts are linked, etc.

Additionally, or alternatively, the server system 106 may be associated with a merchant or a Point of Sale (POS) system network. For example, the server system 106 may be associated with an "acquirer bank" or "acquiring bank" or simply "acquirer", in which a user operating the client device 102 may have an acquirer account.

Additional non-limiting examples of the server system 106 may be a digital wallet server, a cryptographic server and a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.).

In another example, the server system 106 and the HSM 104 may be managed by the same entity. For example, the server system 106 and the HSM 104 may be managed by a financial institution such as an issuer bank, an acquirer bank or by a payment interchange network such as Mastercard® payment system interchange network. In yet another example, both the server system 106 and the HSM 104 may be managed by a merchant, a POS system network or by a digital wallet server.

The client device 102, the server system 106 and the HSM 104 may communicate with one another via the communication network 108. The communication network 108 may be a centralized network or may comprise a plurality of sub-networks that may offer a direct communication or may offer indirect communication between the client device 102, the server system 106 and the HSM 104. Examples of the communication network 108 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 108 may be or include the Internet, intranets, extranets, microwave networks, satellite communications, cellular systems, personal communication services ("PCS"), infrared communications, global area networks, or other suitable networks, etc., or any combination of two or more such networks.

In an example scenario, when the client device 102 needs to send data/session data to the server system 106 over the network 108, the client device 102 encrypts the session data using a unique session key derived from an initial unique session key sent by the server system 106. Further, the initial unique session key is encrypted under a random value master key generated by the server system 106 before sending to the client device 102. Further, the master key is remotely and automatically sent to the client device 102 using asymmetric encryption. In addition, the server system 106 is configured to generate the initial unique MAC key using which the client device 102 generates a unique MAC key valid per session for encryption of the MAC that travels along with the encrypted session data over the network 108 to the server system 106.

Since the encryption key used for session data is only valid per session, the risk of data (hereinafter alternatively referred to as session data) breach reduces tremendously. In existing (conventional) encryption methods, (i.e., not in accordance with the present disclosure), the master key and the initial unique session key are manually loaded into the client device 102. This is a time-consuming process. Further, the MAC exchange happens based on a master session key exchange mechanism. The same MAC encryption key is used for every session and validation. In contrast to existing encryption methods, by using the embodiments of the present disclosure, the MAC is bundled with the DUKPT concept and a unique MAC key is generated that is valid only for a current session. Also, the master keys are exchanged automatically at frequent intervals using asymmetric encryption. Some non-exhaustive example embodiments of cryptographic keys exchange and securely transmitting the data from the client device 102 to the server system 106 are described with reference to the following description, particularly with reference to FIGS. 2 to 12.

Figure 2:
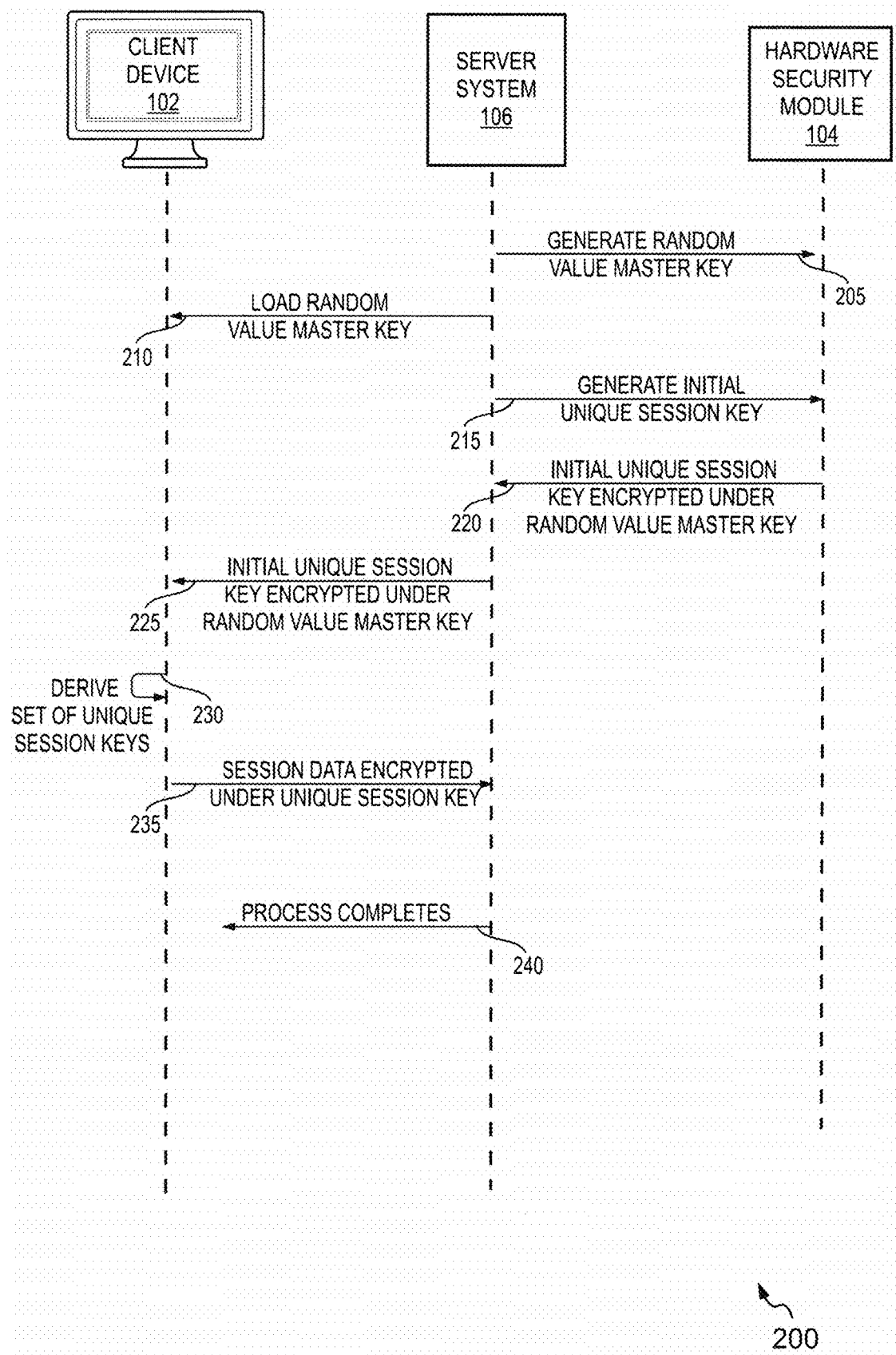
FIG. 2 represents a sequence flow diagram representing cryptographic keys exchange between a client device and a server system, in accordance with an example embodiment.

FIG. 2 represents a sequence flow diagram 200 representing cryptographic keys exchange between a client device and a server system, in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in a sequential manner.

At 205, the server system 106 sends a request to the HSM 104 to generate a random value master key (hereinafter alternatively referred to as master key). Some non-exhaustive examples of the master key include a terminal master key (TMK), a zonal master key (ZMK) and the like in a context of cryptographic keys exchange in a payment network. Terminal Master Key (TMK) is a master key stored in an ATM or a POS terminal that is used to encrypt the stored Terminal PIN Key (TPK) and Message Authentication Code (MAC) Key to protect when they are sent from the host to a server. In an embodiment, any of Pseudo Random Number Generator (PRNG) algorithms such as Lagged Fibonacci generators or linear feedback shift registers may be used to generate the random value master key.

At 210, the master key generated by the HSM 104 is remotely loaded to the client device 102 from the server system 106. Remote loading of the master key is achieved by asymmetric encryption. In an example, event trigger may happen based on predetermined periodic intervals as per the national compliance. Examples of the event trigger include setting a periodic predetermined interval of requesting the master key at every six months. Remote loading of the master key is further explained in detail with reference to FIGS. 3A and 3B later.

At 215, the server system 106 sends a request to generate an initial unique session key to the HSM 104 associated with the server system 106. For generating the initial unique session key, the client device 102 sends an event trigger to the server system 106 on a periodic predetermined interval e.g., every week or every day. The initial unique session key is generated from a Base Derived Key (BDK) generated by the HSM 104 and a Key Serial Number (KSM) associated with the client device 102. This is explained in detail with reference to FIGS. 4A&4B later.

At 220, the HSM 104 sends the initial unique session key to the server system 106 by encrypting the initial unique session key under the random value master key using symmetric encryption.

At 225, the server system 106 forwards the initial unique session key encrypted under the master key to the client device 102.

At 230, the client device 102 derives a set of unique session keys from the initial unique session key. Each unique session key from the set of the unique session keys is used for encrypting the session data for secure transmission to the server system 106. The set of the unique session keys are derived at least by incrementing a session counter of the KSN associated with the client device 102. Once all of the set of the unique session keys are used based on usage per session, the server system 106 may again send the request to generate the initial unique session key to the HSM 104 based on the event trigger set by the client device 102. This is explained in detail with reference to FIGS. 4A&4B later.

At 235, a session data/a content to be protected (by encryption) under a unique session key from the set of the unique session keys is sent to the server system 106. The session data is entered by the user using the client device 102. Some non-exhaustive examples of the session data include a password, a PIN, a CVV number and the like. The session data can be any data that needs to be sent to the server system 106 over the network 108. The process completes at 240.

Thus, a technical effect of a session data encryption completed using symmetric and asymmetric encryption methods is a more secure, less time-consuming and more cost-effective solution of the session data transmission from the client device 102 to the server system 106. As it is not possible to lead back to the BDK from which eventually the set of unique session keys is derived, the chances of data theft reduce tremendously. Moreover, multiple client devices can generate multiple unique session keys from a single BDK generated by the HSM 104, i.e., there is no need to generate multiple BDKs for deriving multiple unique session keys. This feature increases the operational efficiency very much. Further, proximity of human error reduces by avoiding manual intervention of loading the master keys into the client devices.

Figure 3A:
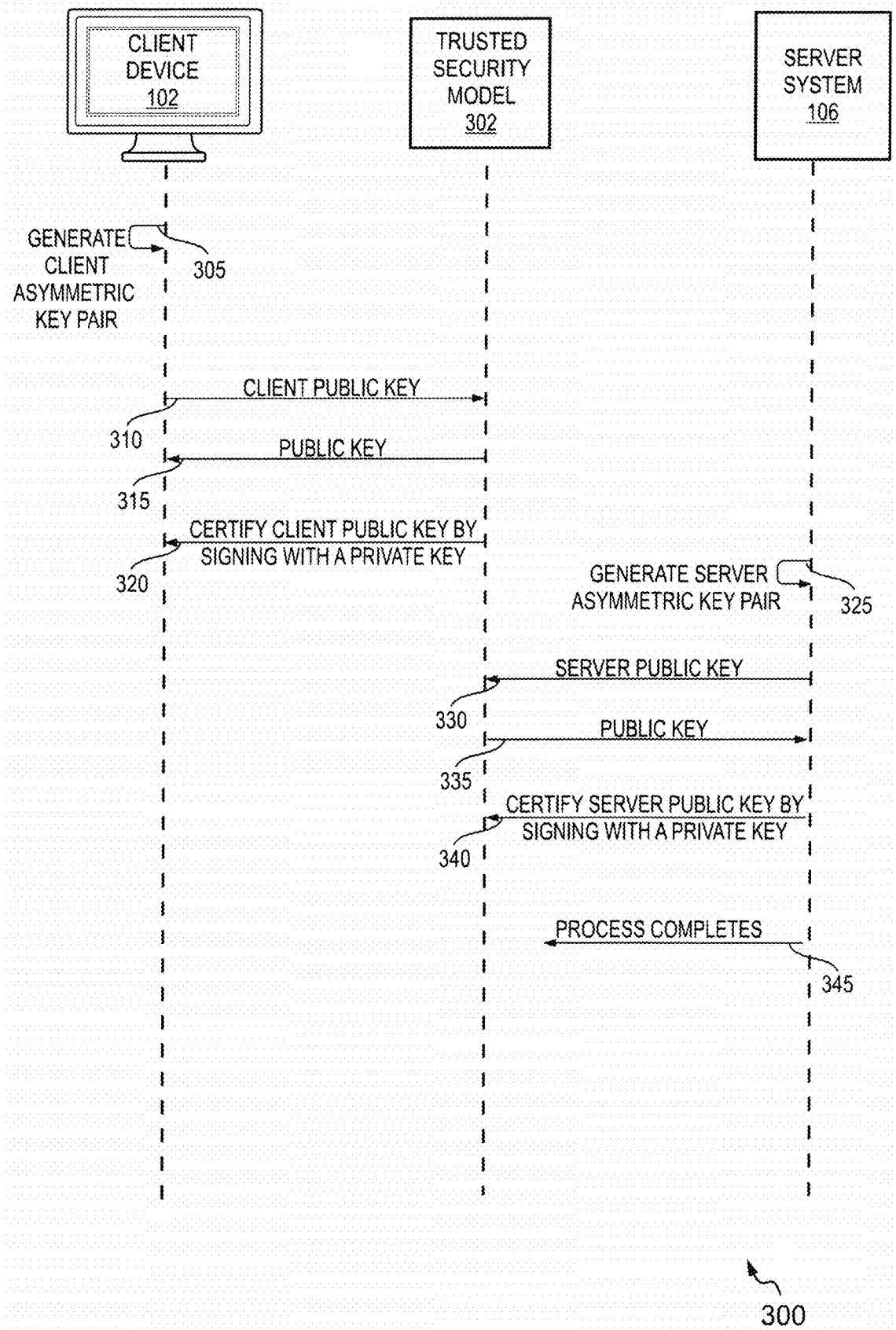
FIG. 3A represents a sequence flow diagram representing certification of asymmetric key pairs by a trusted security model, in accordance with an example embodiment.

FIG. 3A represents a sequence flow 300 diagram representing certification of asymmetric key pairs by a trusted security model, in accordance with an example embodiment. The sequence of operations of the flow diagram 300 may not be necessarily executed in the same order as they are presented. Further, one or more operations may be grouped together and performed in form of a single step, or one operation may have several sub-steps that may be performed in parallel or in sequential manner. More specifically, FIG. 3A (one-time, offline process), in conjunction with FIG. 3B (online process, recurrent process) explains remote loading of the master key (i.e., step 210 of FIG. 2) using the asymmetric encryption to the client device 102 from the server system 106. A trusted security model 302 such as a certification authority is required for exchanging the public keys between two parties (i.e., the client device 102 and the server system 106).

At 305, the client device 102 generates a client asymmetric key pair. The client asymmetric key pair includes a client public key and a client private key. In one non-limiting example, the asymmetric key pair is generated using Rivest-Shamir-Adleman (RSA) algorithm. The RSA algorithm involves operations such as key generation, key distribution, encryption and decryption.

At 310, the client device 102 sends the client public key to the trusted security model 302. More specifically, the client device 102 may send a certificate signing request to the trusted security model 302 along with the client public key.

The trusted security model 302 possess its own asymmetric key pair that includes a public key and a private key for certification purposes. At 315, the trusted security model 302 sends the public key to the client device 102.

At 320, the trusted security model 302 sends the client public key certified by signing with the private key of the asymmetric key pair to the client device 102. In a non-limiting example, the trusted security model 302 may generate an X.509 certificate by signing the certificate signing request using the private key of the asymmetric key pair. The certificate signing request comprises the client public key to be certified by the trusted security model 302. In an embodiment, distribution of the certificate is done only after client authentication.

At 325, the server system 106 generates a server asymmetric key pair using the HSM 104 (not shown). The server asymmetric key pair includes a server public key and a server private key. The server system 106 further stores both the server public key and the server private key in a database. In a preferred embodiment, Rivest Shamir Adleman (RSA) encryption algorithm is used to generate the asymmetric key pair. In various embodiments, other asymmetric encryption algorithms may be used. Some examples include Diffie-Hellman key agreement algorithm, Elliptic Curve Cryptography (ECC), El Gamal, Digital Signature Algorithm (DSA) and the like.

At 330, the server system 106 sends the server public key to the trusted security model 302 for requesting the certification.

At 335, the trusted security model 302 sends its public key to the server system 106.

At 340, the trusted security model 302 sends the server public key certified by signing with the private key of the asymmetric key pair to the server system 106. In a non-limiting example, the trusted security model 302 may generate an X.509 certificate by signing a certificate signing request using the private key of the asymmetric key pair. X.509 is a standard that defines the format of public key certificates. X.509 certificates are used in many Internet protocols, including the secure protocol for browsing the web. The certificate signing request comprises the server public key to be certified by the trusted security model 302. In an embodiment, distribution of the certificate is done only after verifying the server authentication. The process completes at step 345.

It is noted that method flow 300 is a one-time process where two different entities (i.e., the client device 102 and the server system 106) get their public keys certified by a certification authority also known as the trusted security model 302. In an embodiment, based on a predetermined interval event trigger (e.g., every six months), the server system 106 shares the server public key and the server public key certified by the trusted security model 302 to the client device 102 in order to initiate automatic generation and exchange of the random value master key. This is explained hereinafter with reference to FIG. 3B.

Figure 3B:
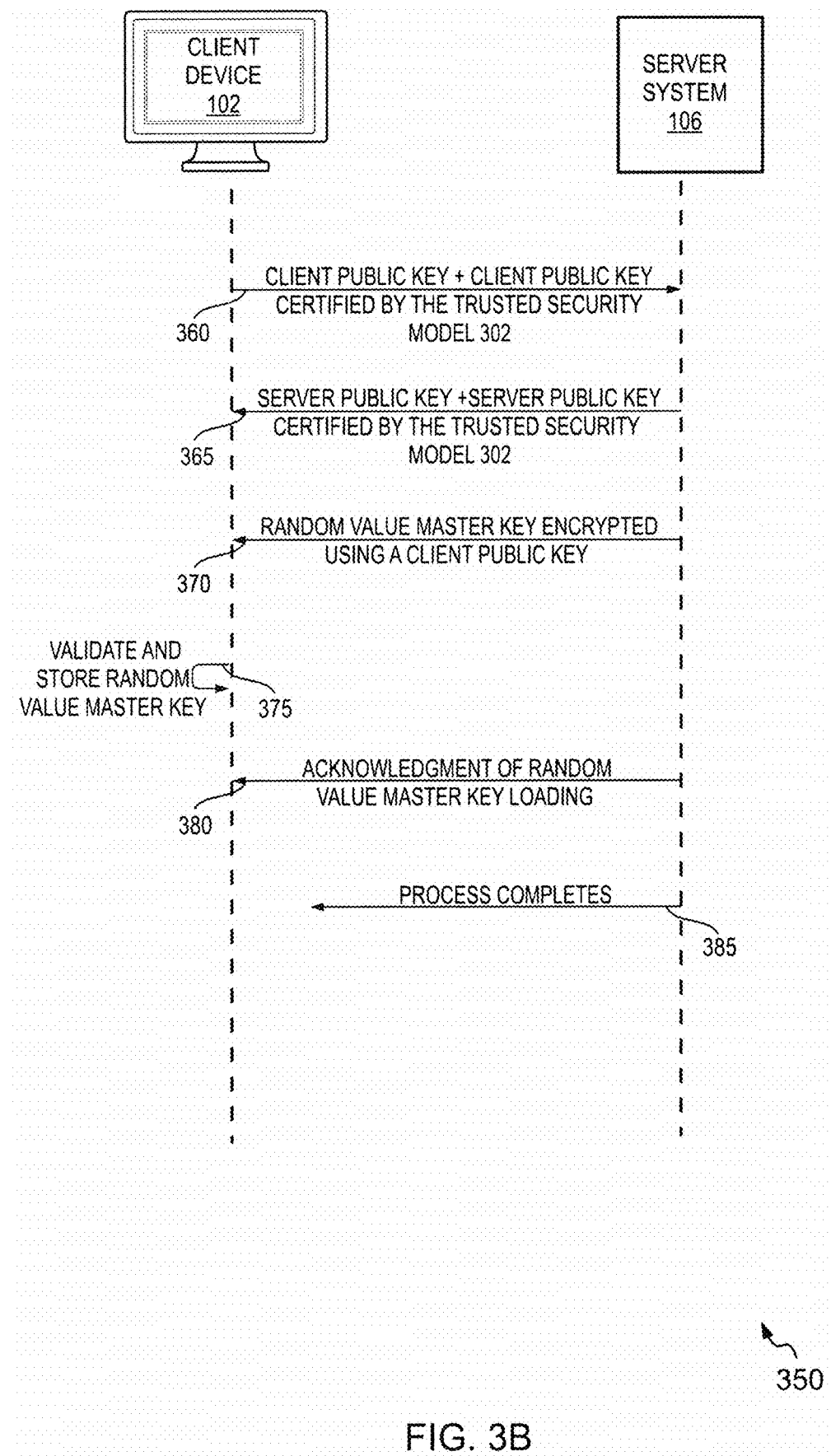
FIG. 3B represents a sequence flow diagram representing remote loading of a random value master key in a client device using asymmetric encryption, in accordance with an example embodiment.

FIG. 3B represents a sequence flow diagram 350 representing remote loading of a random value master key in a client device using asymmetric encryption, in accordance with an example embodiment. The sequence of operations of the flow diagram 300 may not be necessarily executed in the same order as they are presented. Further, one or more operations may be grouped together and performed in form of a single step, or one operation may have several sub-steps that may be performed in parallel or in sequential manner.

At 360, the client device 102 sends the client public key and the client public key certified by the trusted security model 302 by signing using the private key to the server system 106.

At 365, the server system 106 sends the server public key and the server public key certified by the trusted security model 302 signed using the private key to the client device 102.

At 370, the server system 106 sends a random value master key encrypted using the client public key to the client device 102. The master key is generated by the HSM 104 (FIG. 1) associated with the server system 106. The server system 106 is further configured to certify the encrypted master key by signing using the server private key.

At 375, the client device 102 validates the master key by decrypting the master key. The client device 102 is capable of verifying the encrypted master key using the server public key stored in the database and decrypting the master key using the client private key owned. Upon successful validation, the master key is stored in the database of the client device 102 and loaded into an application of the client device 102 for use in further processing.

At 380, the client device 102 sends an acknowledgement of the master key loading to the server system 106. After receiving the acknowledgement from the client device 102, the server system 106 stores the master key into an associated database. The process completes at 385.

Figure 4A:
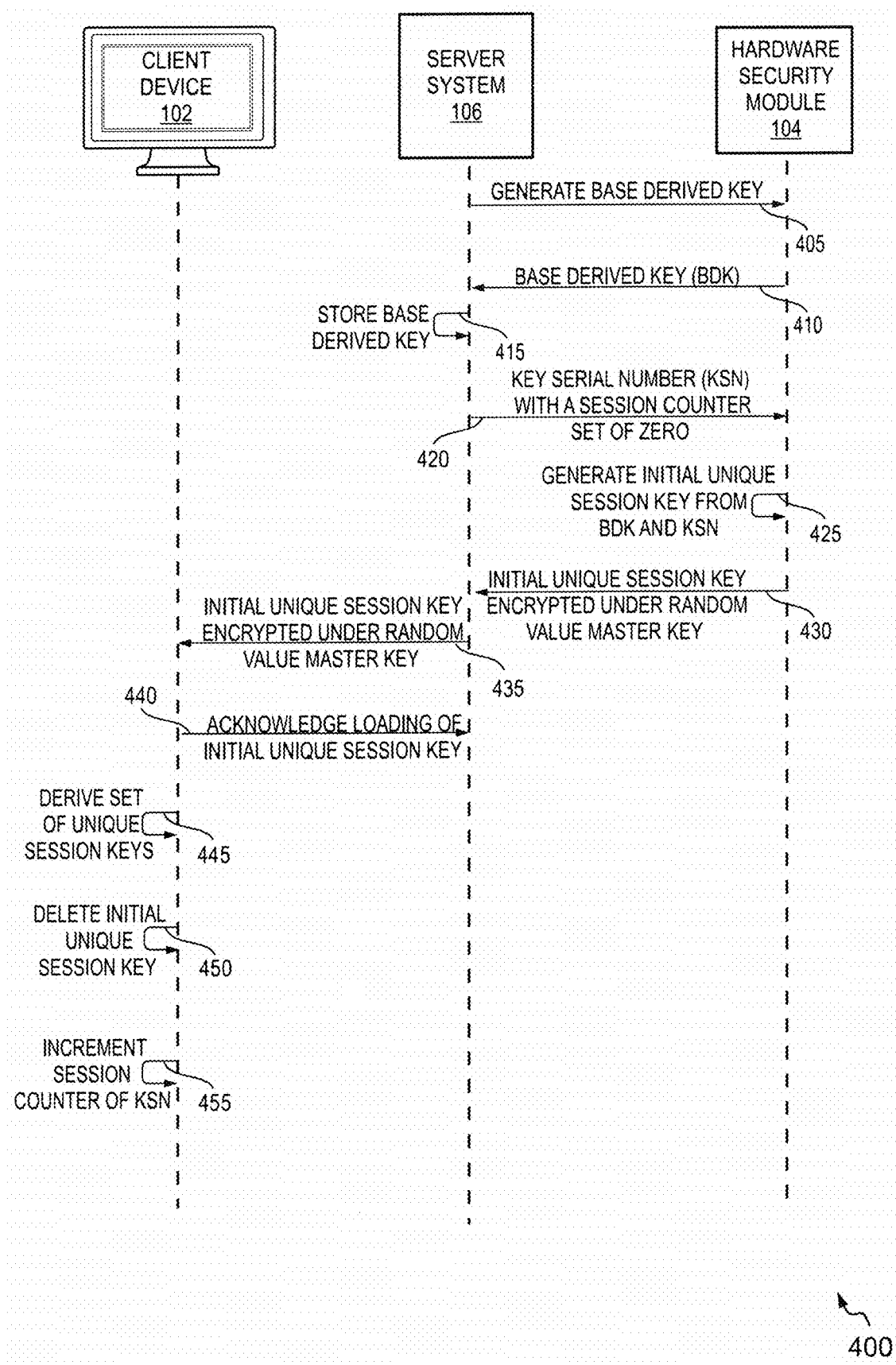
FIGS. 4A and 4B represent a sequence flow diagram representing encryption of a session data using a unique session key derived for transmission to the server system, in accordance with an example embodiment.
Figure 4B:
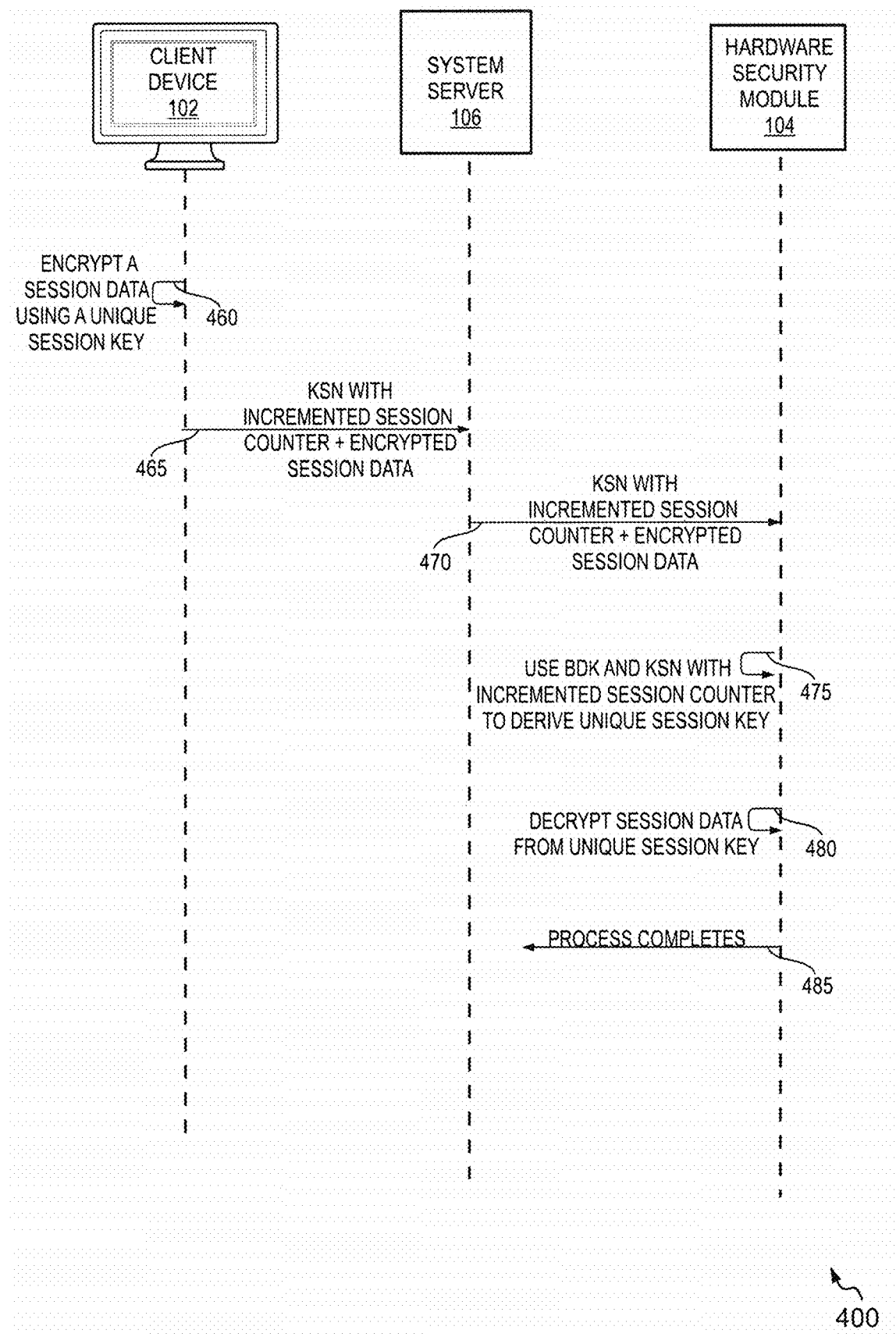

FIGS. 4A&4B represents a sequence flow diagram 400 representing encryption of a session data using a unique session key derived for transmission to the server system, in accordance with an example embodiment. The sequence of operations of the flow diagram 400 may not be necessarily executed in the same order as they are presented. Further, one or more operations may be grouped together and performed in form of a single step, or one operation may have several sub-steps that may be performed in parallel or in sequential manner.

At 405, the server system 106 sends a request to generate a Base Derived Key (BDK) to the HSM 104. At 410, the HSM 104 sends the generated BDK to the server system 106. At 415, the server system 106 stores the BDK into the associated database. The BDK itself is never exposed, but instead is used to create another key, called an initial unique session key.

At 420, the server system 106 sends a Key Serial Number (KSN) of the client device 102 to the HSM 104 with a session counter set to zero. The KSN with the session counter set to zero may hereinafter alternatively be referred to as initial KSN. In at least one embodiment, the KSN is formed of eight characters long terminal identifier, five characters long device identifier and five characters long session/transaction counter. In an example embodiment, an authorized person from the client device 102 generates the initial KSN with the session counter set to zero and shares the initial KSN with the client device 102 and the server system 106 for generating an initial unique session key. In terms of a payment network, the payment server generates only one BDK. However, there are e.g., three different KSN for three different banks (such as an issuer bank or an acquirer bank) which use the payment network facilitated by the payment server for processing the payment card based transactions. Therefore, the five characters long device identifier of the KSN is different for each three banks and five characters long transaction counter is initially always set to zero for generating the initial unique session keys for each bank. Thus, there will be three different initial unique session keys derived for three different banks for the single BDK generated by the HSM 104.

At 425, the HSM 104 generates an initial unique session key from the initial KSN and BDK. At 430, the HSM 104 encrypts the initial unique session key under the master key and sends the encrypted initial unique session key to the server system 106. At 435, the server system 106 forwards the encrypted initial unique session key to the client device 102.

At 440, the client device 102 sends acknowledgement of loading of the initial unique session key. Prior to that, the client device 102 decrypts the initial unique session key from the master key as the master key is already sent by the server system 106 using asymmetric encryption (as explained with reference to FIG. 3B, step 370) and is stored in the database of the client device 102 (as explained with reference to FIG. 3B, step 375). In an embodiment, after receiving the acknowledgement from the client device 102, the server system 106 stores the initial unique session key into its database.

At 445, the client device 102 derives an irreversible set of unique session keys from the initial KSN and the initial unique session key decrypted from the master key. In an example embodiment, the set of unique session keys comprises twenty-one future keys to be used for twenty-one different sessions to be happened between the client device 102 and the server system 106.

At 450, the client device 102 deletes the initial unique session key after generating the set of the unique session keys. At 455, the client device 102 increments the session counter (last five characters forming part of the KSN) of the KSN. The session counter is incremented at every session. At 460, the session data is encrypted using a unique session key (e.g., 32 byte long) selected from the set of unique session keys and the KSN with incremented session counter. As for each session, the session counter is incremented, there shall be a new unique session key available per session. At 465, the client device 102 sends the encrypted session data along with the KSN with incremented session counter to the server system 106.

At 470, the server system 106 forwards the encrypted session data along with the KSN with incremented session counter to the HSM 104. At 475, the HSM 104 uses the stored and generated BDK along with the received KSN with incremented session counter to derive the unique session key used for encrypting the session data for the current session. Accordingly, at 480, the session data is decrypted from the unique session key retrieved using the BDK and KSN with incremented session counter. The process completes at 485. As explained hereinabove, the derived unique session key keeps information/session data safe. The process cannot be reversed to lead back to the BDK, and if one of the keys get compromised in the client device 102, it would immediately be replaced by a new key in the next session. Thus, through derivation, DUKPT forms a self-recycling system that promotes security, efficiency, and ease of implementation. It is noted that for different type of session data there may be required a separate DUKPT key infrastructure. For example, each key must be used for its own purpose such that the BDKs for Primary Account Number (PAN) and PIN encryption cannot be shared.

In at least one embodiment, Message Authentication Code (MAC) key is used for creating the MAC (64-bit hash code that is calculated from an unencrypted session data (e.g., an ATM-message) and is added to/tagged along with the message/session data to ensure that the session data has not been tampered during the transmission from the client device 102 (e.g., ATM) to the server system 106. The MAC key protects both a message's data integrity as well as its authenticity by allowing to detect any changes to the message content. In at least one embodiment, MAC key is derived using DUKPT concept which gives different unique MAC session keys for each transaction. Further, end to end secure MAC key verification is required. Only upon successful verification of the MAC key and the authentication of the sending party, the transaction proceeds further. Bundling of DUKPT with MAC is explained in detail hereinafter with reference to FIG. 5.

Figure 5:
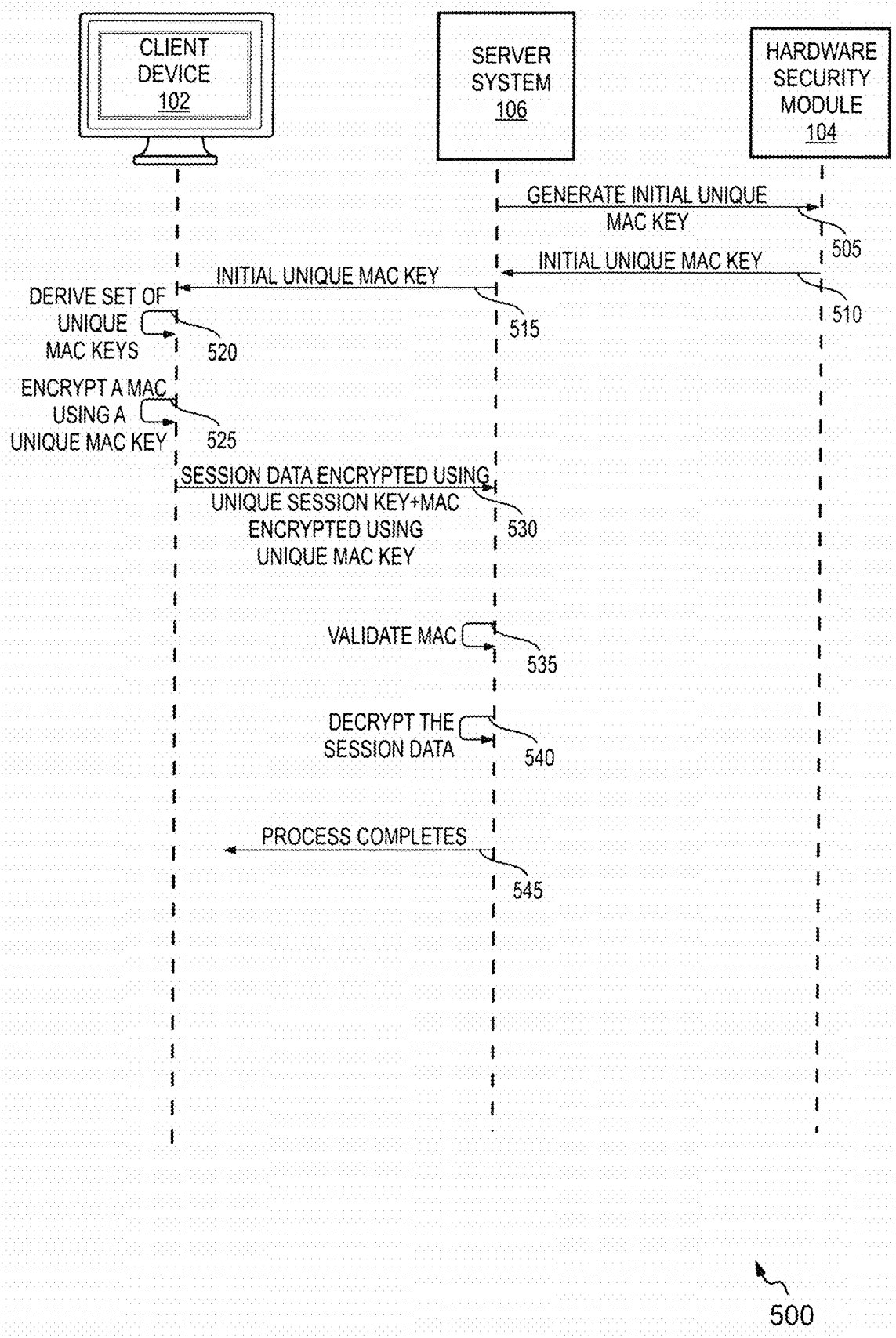
FIG. 5 represents a sequence flow diagram representing derivation of a unique Message Authentication Code (MAC) key based on a derived unique key per session, in accordance with an example embodiment.

FIG. 5 represents a sequence flow diagram 500 representing derivation of a unique MAC key based on a derived unique key per session, in accordance with an example embodiment. The sequence of operations of the flow diagram 500 may not be necessarily executed in the same order as they are presented. Further, one or more operations may be grouped together and performed in form of a single step, or one operation may have several sub-steps that may be performed in parallel or in sequential manner.

At 505, the server system 106 sends a request to generate an initial unique MAC key to the HSM 104. Simultaneously or subsequently, the server system 106 may send a Key Serial Number (KSN) with a session counter set to zero (i.e., the initial KSN) and a request to generate a Base Derived Key (BDK) to the HSM 104. As explained with reference to FIGS. 4A and 4B, the KSN may further include eight characters long terminal ID and five characters long device identifier along with five characters long session counter. The HSM 104 may send the generated BDK to the server system 106.

At 510, the HSM 104 sends the initial unique MAC key to the server system 106. In an example embodiment, the HSM 104 generates the initial unique MAC key from the initial KSN and the BDK. In another example embodiment, the HSM 104 encrypts the initial unique MAC key under a master key and sends the encrypted initial unique MAC key to the server system 106. At 515, the server system 106 forwards the initial unique MAC key to the client device 102.

At 520, the client device 102 derives an irreversible set of unique MAC keys from the initial KSN and the initial unique MAC key.

At 525, the MAC is encrypted using a unique MAC key selected from the set of unique MAC keys. As for each session, the session counter of the KSN is incremented, there shall be a new unique MAC key available per session.

At 530, the client device 102 sends the session data encrypted using the unique session key along with the MAC encrypted using the unique MAC key. The client device 102 may also send the KSN with incremented session counter to the server system 106. In an embodiment, the generation and loading of the initial unique MAC key as well as the derivation of the set of the unique MAC keys occurs prior to an actual session/transaction between the client device 102 and the server system 106.

At 535, the server system 106 validates the MAC. In an example embodiment, the server system 106 may generate the unique MAC key using the KSN with incremented session counter and the BDK generated by the HSM 104 for generating the initial unique MAC key. The server system 106 may further decrypt the MAC from the generated unique MAC key and thereafter validate the MAC. Upon successful validation of the MAC key i.e., upon successful authentication of the client device, at 540, the server system 106 decrypts the session data from the unique session key. Decryption of the session data is explained with reference to steps 470-480 of FIGS. 4A&4B. The process completes at 545. One specific example of a secure communication of a sensitive session data describing unique features of the present disclosure is explained with reference to FIG. 6.

Figure 6:
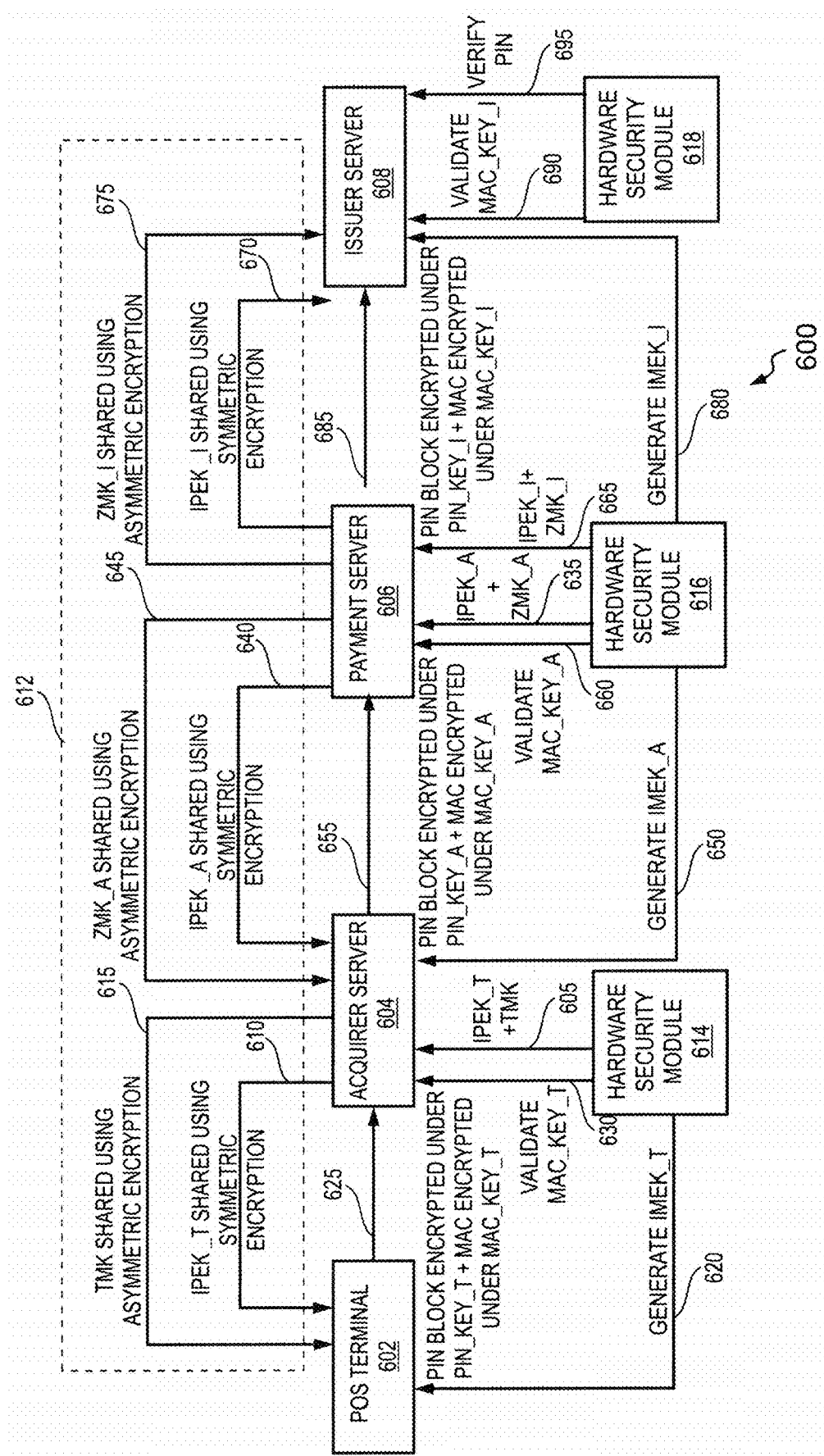
FIG. 6 represents a simplified schematic flow diagram of completing a payment transaction in a payment network, in accordance with an example embodiment.

FIG. 6 represents a simplified schematic flow diagram 600 of completing a payment transaction in a payment network, in accordance with an example embodiment. More specifically, a payment system is represented in which a credit/debit card user uses a payment card interchange network, such as, payment network. Examples of payment interchange network include, but not limited to, Mastercard® payment system interchange network. The payment network includes entities such as a POS terminal 602, an acquirer server 604, a payment server 606 and an issuer server 608. The payment network further includes an HSM 614, an HSM 616 and an HSM 618 associated with the acquirer server 604, the payment server 606 and the issuer server 608, respectively. In various embodiments, a smartphone, a tablet, a personal digital assistant (PDA), a notebook, a kiosk, an ATM or any electronic device having the capability to perform Derived Unique Key per Transaction (DUKPT) based encryption can be used instead of the POS terminal 602 without deviating from the scope of the description.

The issuer server 608 is associated with an issuing bank in which a user may have an account (e.g., a cardholder account), issues a payment card, such as a credit card or a debit card, to the user. The payment card is linked to the user's account. The user is the cardholder, who uses the payment card to tender payment for a purchase from a facility such as a merchant. To accept payment with the payment card, the merchant must normally establish an account with a financial institution that is part of the financial payment system. This financial institution is usually called the merchant bank or the acquirer bank. Acquirer server 604 is associated with the acquirer bank.

When the cardholder tenders payment for a purchase with a payment card, he may need to enter a Personal Identification Number (PIN) of the payment card using a POS terminal such as the POS terminal 602. The PIN (e.g., a four-digit number) is sent by the merchant for verification to the acquirer server 604 for the processing the payment. This PIN is an example of the session data which needs utmost level of protection during transmission from the POS terminal 602 (e.g., the client device 102) to the acquirer server 604 (e.g., the server system 106). Therefore, the PIN is encoded into a PIN block (e.g., Pin Block format 05). The PIN block is further encrypted by an algorithm such as a triple data encryption algorithm, advanced encryption standard and the like. In an embodiment, the PIN Block is encrypted under a Terminal Pin Key (TPK) by the POS terminal 602. For example, TPK is a POS terminal resident DES key used for encrypting PINs/PIN blocks in outgoing messages and for decrypting the incoming messages. More specifically, TPK is a unique session key derived from the initial unique session key (hereinafter referred to as Initial Pin Encryption Key for the POS terminal 602 (IPEK_T)) used by the POS terminal 602 to encrypt the PIN block with the underlying PIN for sending to the acquirer server 604.

As shown, the IPEK_T is generated by the HSM 614 associated with the acquirer server 604 (see, 605). The IPEK_T is generated using a BDK_T (i.e., BDK of the POS terminal 602, not shown) and a KSN_T (i.e., KSN of the POS terminal 602, not shown) with transaction counter set to zero as explained with reference to FIGS. 4A&4B. The IPEK_T is further encrypted using a symmetric encryption (see, 610) by a Terminal Master Key (TMK, an example of the random value master key) generated by the HSM 614 (see, 605) as explained with reference to FIGS. 4A&4B for sending to the POS terminal 602. The TMK is shared by the acquirer server 604 to the POS terminal 602 using asymmetric encryption (see, 615) as explained earlier in detail with reference to FIGS. 3A and 3B.

Using the IPEK_T, the POS terminal 602 derives a set of unique session keys per transaction. The derivation of the set of unique session keys is explained in detail with reference to FIGS. 4A&4B. A unique key such as a PIN_KEY_T is selected from the set to encrypt the PIN block and the underlying PIN.

PIN_KEY_T=D (IPEK_T, KSN_T)

Where IPEK_T refers to Initial Pin Encryption Key remotely loaded into the POS terminal 602 and Where KSN_T refers to KSN of the POS terminal 602 with transaction counter set to 0.

As the KSN_T gets incremented for each transaction, there will be created a unique PIN_KEY_T for each transaction.

In at least one embodiment, the acquirer server 604 sends an initial unique MAC key (hereinafter referred to as Initial MAC Encryption Key for the POS terminal 602 (IMEK_T)) to the POS terminal 602. The IMEK_T is generated with the help of the HSM 614 (see, 620). When card holder performs the transaction from the POS terminal 602, the POS terminal 602 processes the transaction and generates the MAC (hash code) for transaction request using a unique MAC key such as a MAC_KEY_T. The MAC_KEY_T is selected from the set of unique MAC keys derived by the POS terminal 602 using the IMEK_T received from the acquirer server 604. The derivation of the set of unique MAC keys is already explained in detail with reference to FIG. 5.

MAC_KEY_T=D (IMEK_T, KSN_T)

Where IMEK_T refers to Initial MAC Encryption Key remotely loaded into the POS terminal 602, and Where KSN_T refers to KSN of the POS terminal 602 with transaction counter set to 0.

As KSN_T gets incremented for each transaction, there will be created a unique MAC_KEY_T for each transaction.

The POS terminal 602 sends the transaction request to the acquirer server 604 by sending the encrypted PIN block under PIN_KEY_T and encrypted MAC under MAC_KEY_T (see, 625). The acquirer server 604 performs verification of MAC_KEY_T (see, 630) and identifies the POS terminal 602. Only after authentication of the POS terminal 602 (i.e., the sender of the keys), the acquirer server 604 translates the PIN block encrypted under PIN_KEY_T to PIN_KEY_A. The translation comprises decrypting the PIN block encrypted under PIN_KEY_T using the BDK_T and the KSN_T with the incremented transaction counter (as received from the POS terminal 602 along with the encrypted PIN block) and encrypting the PIN block under the PIN_KEY_A.

In an embodiment, the payment server 606 sends an initial unique session key (hereinafter referred to as Initial Pin Encryption Key for the acquirer server 604 (IPEK_A)) to the acquirer server 604 for deriving a set of unique session keys. A unique session key such as a PIN_KEY_A is selected from the set to translate the PIN block encrypted under PIN_KEY_T to PIN_KEY_A. As shown, the IPEK_A is generated by the HSM 616 associated with the payment server 606 (see, 635). The IPEK_A is generated using a BDK_A (i.e., the BDK of the acquirer server 604, not shown) and a KSN_A (i.e., the KSN of the acquirer server 604, not shown) with a transaction counter set to zero. IPEK_A is further encrypted using a symmetric encryption (see, 640) by a Zonal Master Key (ZMK_A, an example of the random value master key) generated by the HSM 616 (see, 635) for the acquirer server 604. The ZMK_A is shared by the payment server 606 to the acquirer server 604 using asymmetric encryption (see, 645).

PIN_KEY_A=D (IPEK_A, KSN_A)

Where IPEK_A refers to Initial Pin Encryption Key remotely loaded into the acquirer server 604, and Where KSN_A refers to KSN of the acquirer server 604 with transaction counter set to 0.

In at least one embodiment, the payment server 606 sends an initial unique MAC key (hereinafter referred to as Initial MAC Encryption Key for the acquirer server 604 (IMEK_A)) to the acquirer server 604. The IMEK_A is generated with the help of the HSM 616 (see, 650). The acquirer server 604 generates the MAC (hash code) for the current message using a unique MAC key such as a MAC_KEY_A.

The MAC_KEY_A is selected from the set of unique MAC keys derived by the acquirer server 604 using the IMEK_A received from the payment server 606. In an example, MAC_KEY_A can be represented as follows:

MAC_KEY_A=D (IMEK_A, KSN_A)

Where IMEK_A refers to Initial MAC Encryption Key remotely loaded into the acquirer server 604, and Where KSN_A refers to KSN of the acquirer server 604 with transaction counter set to 0.

As KSN_A gets incremented for each transaction, there will be created a unique MAC_KEY_A for each transaction.

The acquirer server 604 sends the PIN block encrypted under PIN_KEY_A and the MAC encrypted under MAC_KEY_A to the payment server 606 (see, 655). The payment server 606 performs verification of MAC_KEY_A (see, 660) using the HSM 616 and identifies issuer of the payment card. Only after such authentication, the payment server 606 translates the PIN block encrypted under from PIN_KEY_A to PIN_KEY_I. The translation comprises decrypting the PIN block encrypted under PIN_KEY_A using the BDK_A and the KSN_A with the incremented transaction counter (as received from the acquirer server 604 along with the encrypted PIN block) and encrypting the PIN block under the PIN_KEY_I.

In an embodiment, the payment server 606 sends an initial unique session key (hereinafter referred to as Initial Pin Encryption Key for the issuer server 608 (IPEK_I)) to the issuer server 608. The payment server 606 further derives a set of unique session keys from the IPEK_I. A unique session key such as a PIN_KEY_I is selected from the set to translate the PIN block encrypted under PIN_KEY_A to PIN_KEY_I. As shown, the IPEK_I is generated by the HSM 616 associated with the payment server 606 (see, 665). The IPEK_I is generated using a BDK_I (i.e., the BDK of the issuer server 608, not shown) and a KSN_I (i.e., the KSN of the issuer server 608, not shown) with a transaction counter set to zero. IPEK_I is further encrypted using a symmetric encryption (see, 670) by a Zonal Master Key (ZMK_I, an example of the random value master key) generated by the HSM 616 (see, 665) for the issuer server 608. The ZMK_I is shared by the payment server 606 to the issuer server 608 using asymmetric encryption (see, 675). In an example, PIN_KEY_I can be represented as follows:

PIN_KEY_I=D (IPEK_I, KSN_I)

Where IPEK_I refers to Initial Pin Encryption Key remotely loaded into the issuer server 608, and Where KSN_I refers to KSN of the issuer server 608 with transaction counter set to 0.

In at least one embodiment, the payment server 606 sends initial unique MAC key (hereinafter referred to as Initial MAC Encryption Key for the issuer server 608 (IMEK_I)) to the issuer server 608 generated with the help of the HSM 616 (see, 680). The payment server 606 further generates the MAC (hash code) for the current message using a unique MAC key such as a MAC_KEY_I selected from the set of unique MAC keys derived by the payment server 606 using the IMEK_I. In an example, MAC_KEY_I can be represented as follows:

MAC_KEY_I=D (IMEK_I, KSN_I)

Where IMEK_I refers to Initial MAC Encryption Key remotely loaded into the issuer server 608, and Where KSN_I refers to KSN of the issuer server 608 with transaction counter set to 0.

The payment server 606 sends the PIN block encrypted under PIN_KEY_I and the MAC encrypted under MAC_KEY_I to the issuer server 608 (see, 685). The issuer server 608 performs verification of MAC_KEY_I with the help of the HSM 618 associated with the issuer server 608. The HSM 618 further generates the PIN_KEY_I using the IPEK_I and KSN_I to decrypt the encrypted PIN block. Upon successful decryption, the HSM 618 verifies the PIN from the PIN block using a PIN offset (see, 695).

In an example embodiment, upon verifying the PIN, the issuer server 608 notifies the payment server 606 with a response again using a MAC encrypted under a unique MAC key valid only for a session. The payment server 606 validates the MAC and forwards the response to the acquirer server 604 along with a MAC encrypted under another unique MAC key. The acquirer server 604 validates the MAC and forwards the response to the POS terminal 602 along with a MAC encrypted under yet another unique MAC key.

In an example embodiment, the process explained inside the dotted box 612 of FIG. 6 may occur before an initialization of an actual transaction. The IPEKs for each entity may be shared automatically at predetermined periodic intervals (e.g., weekly) based on the event triggers set by the hosts. Similarly, the master keys for each entity may also be shared automatically at predetermined periodic intervals (e.g., half yearly). Further, the process explained outside the dotted box 612 may occur during an actual transaction when a cardholder enters a PIN at the POS terminal 602 for making payment of a purchase made at a merchant facility. The encrypted MAC tagged with the encrypted PIN are used to authenticate the entities present in a current transaction and the transaction proceeds further only after authentication of the entities. In another example embodiment, all the sharing of IPEKs, master keys and MAC verification of authenticating the entities may occur at once without deviating from the scope of the disclosure.

Figure 7:
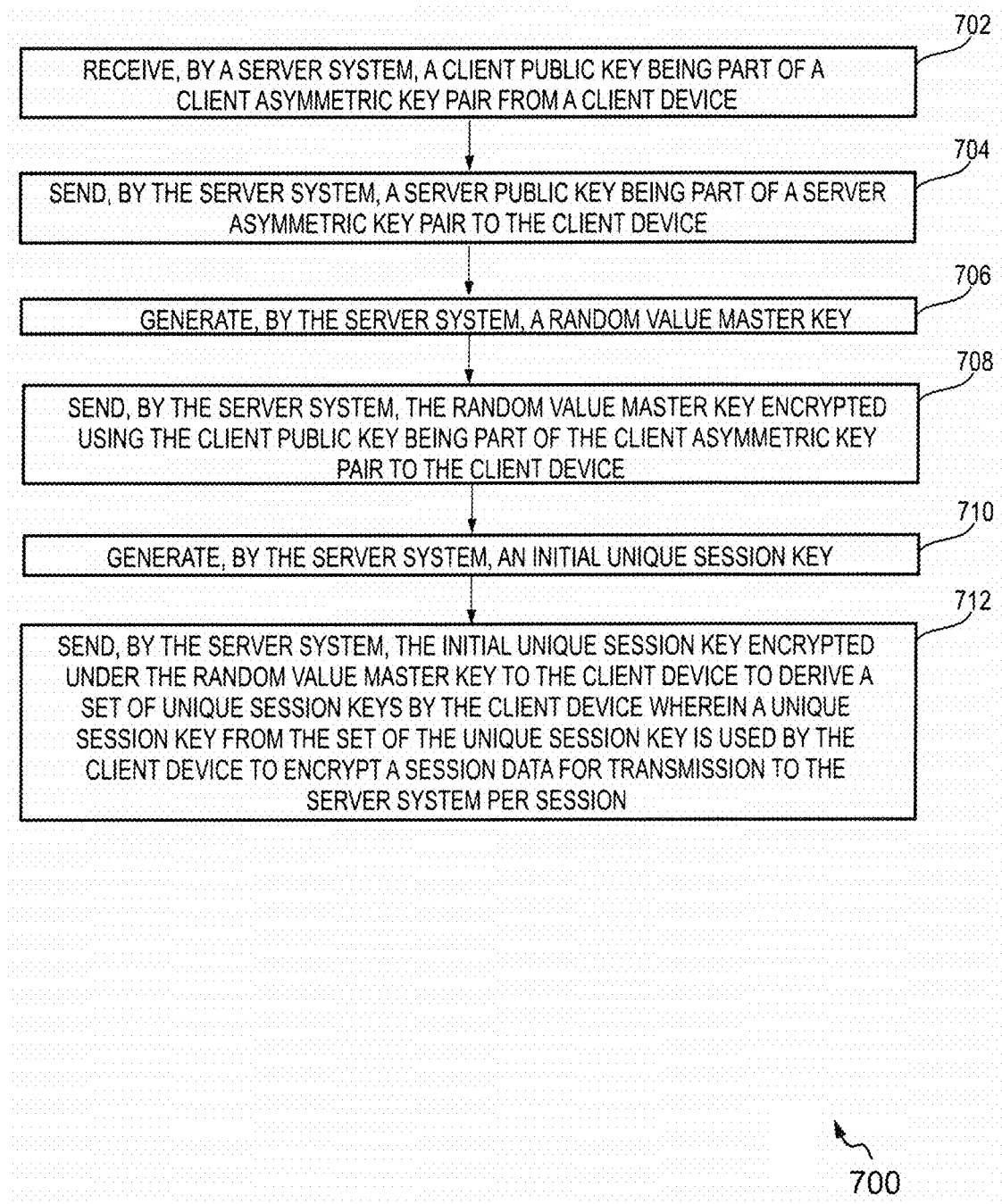
FIG. 7 illustrates a flow diagram of a method for exchanging cryptographic keys, in accordance with an example embodiment.

FIG. 7 illustrates a flow diagram of a method 700 for exchanging cryptographic keys, in accordance with an example embodiment. The method 700 depicted in the flow diagram may be executed by, for example, the at least one server system such as a digital wallet server, an acquirer server, an issuer server, an ecommerce server, a payment server and the like. Further, the server system may include an HSM for encrypting and decrypting session data. The Operations of the flow diagram 700, and combinations of operation in the flow diagram 700, may be implemented by, for example, hardware, firmware, a processor, circuitry and/or a different device associated with the execution of software that includes one or more computer program instructions. The method 700 starts at operation 702.

At 702, the method 700 includes receiving, by a server system, a client public key being part of a client asymmetric key pair from a client device.

At 704, the method 700 includes sending, by the server system, a server public key being part of a server asymmetric key pair to the client device.

At 706, the method 700 includes generating, by the server system, a random value master key.

At 708, the method 700 includes sending, by the server system, the random value master key encrypted using the client public key being part of the client asymmetric key pair to the client device.

At 710, the method 700 includes generating, by the server system, an initial unique session key.

At 712, the method 700 includes sending, by the server system, the initial unique session key encrypted under the random value master key to the client device to derive a set of unique session keys by the client device. A unique session key from the set of the unique session keys is used by the client device to encrypt a session data for transmission to the server system per session. The method ends at operation 712.

Figure 8:
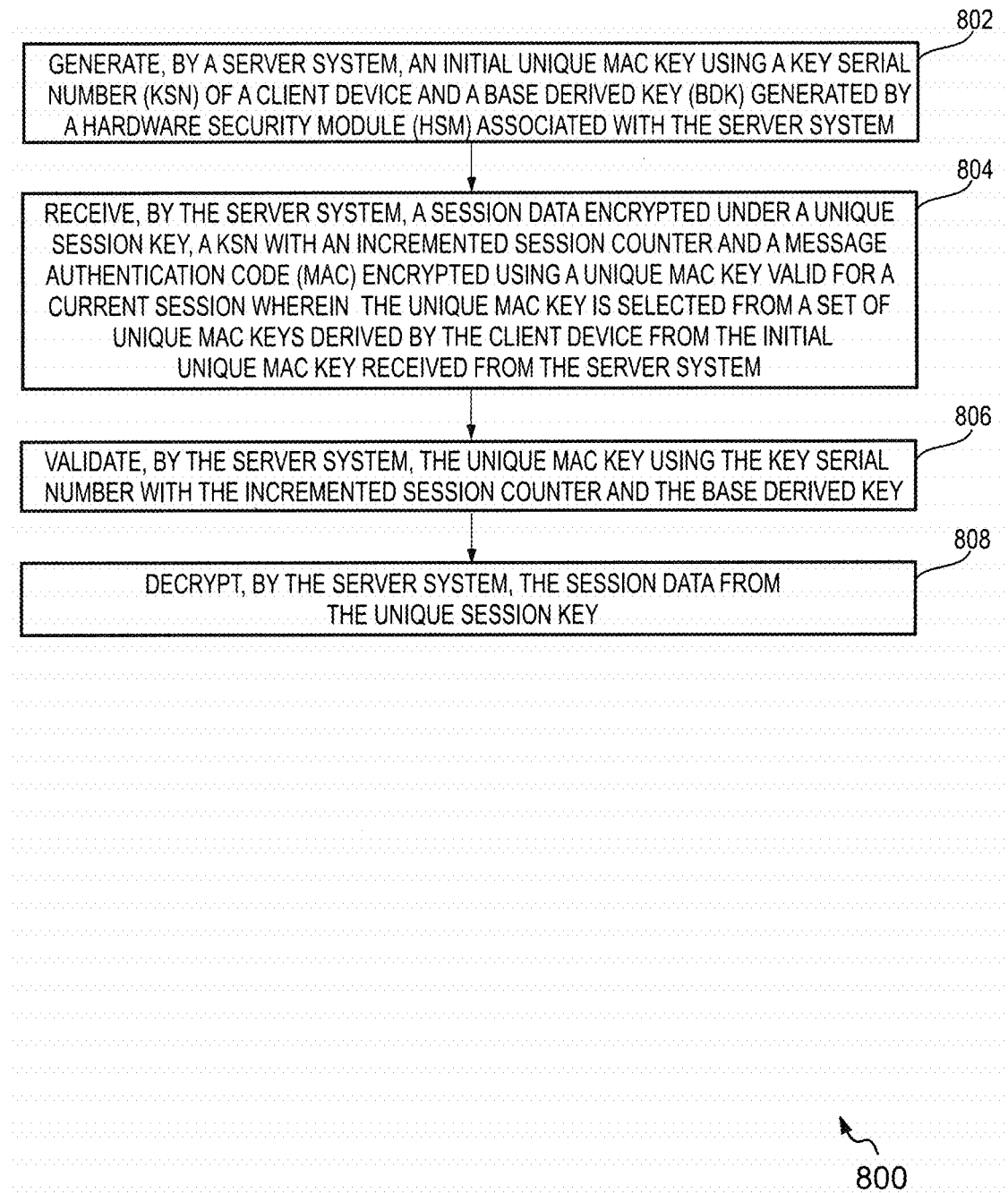
FIG. 8 illustrates a flow diagram of another method for exchanging cryptographic keys, in accordance with an example embodiment.

FIG. 8 illustrates a flow diagram of another method 800 for exchanging cryptographic keys, in accordance with an example embodiment. The method 800 depicted in the flow diagram may be executed by, for example, during a session for authentication of a client device and a server system and for authentication of the session data. Operations of the method 800, and combinations of operation in the method 800, may be implemented by, for example, hardware, firmware, a processor, circuitry and/or a different device associated with the execution of software that includes one or more computer program instructions. The method 800 starts at operation 802.

At 802, the method 800 includes generating, by a server system, an initial unique MAC key using a Key Serial Number (KSN) of a client device and a Base Derived Key (BDK) generated by a Hardware Security Module (HSM) associated with the server system.

At 804, the method 800 includes, receiving, by the server system, a session data encrypted under a unique session key, a KSN with an incremented session counter and a Message Authentication Code (MAC) encrypted using a unique MAC key valid for a current session. The unique MAC key is selected from a set of unique MAC keys derived by the client device from the initial unique MAC key received from the server system.

At 806, the method 800 includes validating, by the server system, the unique MAC key using the KSN with the incremented session counter and the BDK.

Upon successful validation of the unique MAC key, at 808, the method 800 includes decrypting, by the server system, the session data from the unique session key. The initial unique MAC key is generated using the KSN with the session counter set to zero. The method ends at operation 808.

Figure 9:
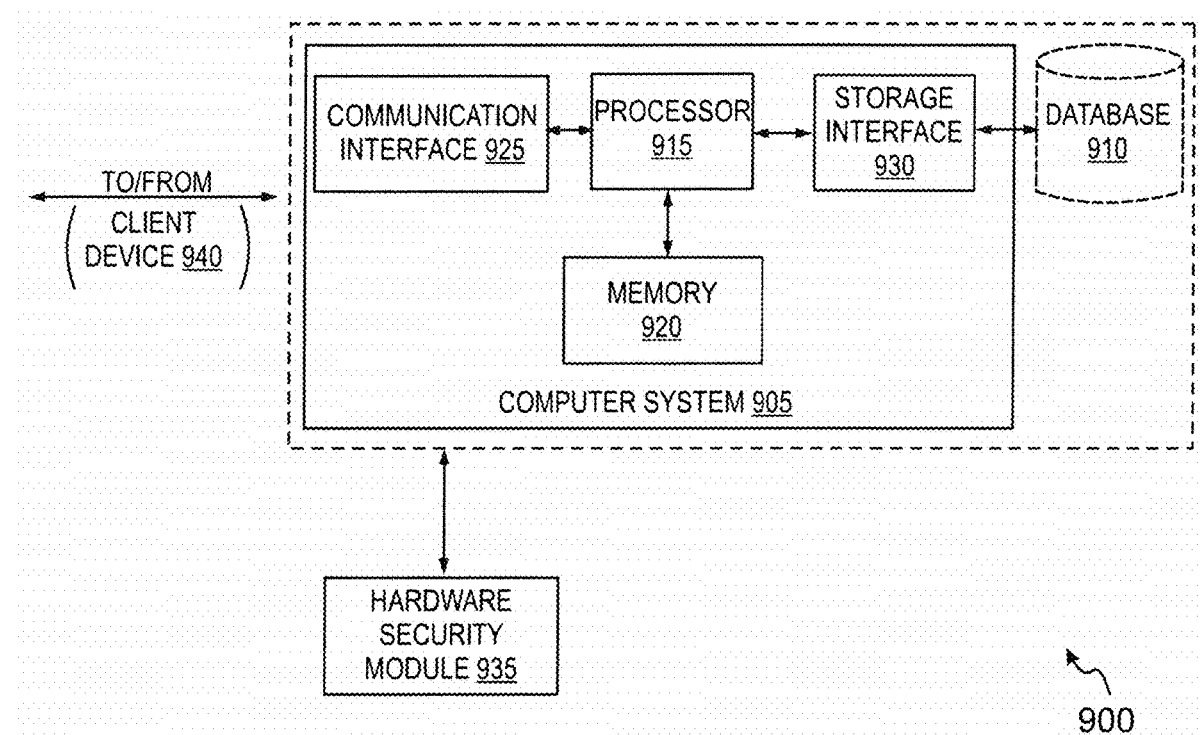
FIG. 9 is a simplified block diagram of a server system, in accordance with one embodiment of the present disclosure.

FIG. 9 is a simplified block diagram of a server system 900, in accordance with one embodiment of the present disclosure. The server system 900 is an example of a server system that includes the server system 106 operably connected to the hardware security module 104 of FIG. 1. Examples of the server system 900 includes, but not limited to, an acquirer server, an issuer server, a digital wallet server, a payment server and the like connected to a hardware security module. The server system 900 includes a computer system 905, a database 910 and a hardware security module (HSM) 935. The computer system 905 includes a processor 915 for executing instructions. Instructions may be stored in, for example, but not limited to, a memory 920. The processor 915 may include one or more processing units (e.g., in a multi-core configuration). The processor 915 is operatively coupled to a communication interface 925 such that the computer system 905 can communicate with a client device 940 (e.g., the client device 102). For example, the communication interface 925 may receive session data from the client device 940.

The processor 915 may also be operatively coupled to the database 910. The database 910 is any computer-operated hardware suitable for storing and/or retrieving data. The database 910 may include multiple storage units such as hard disks and/or solid-state disks in a redundant array of inexpensive disks (RAID) configuration. The database 910 may include, but not limited to, a storage area network (SAN) and/or a network attached storage (NAS) system. In some embodiments, the database 910 is integrated within the computer system 905. For example, the computer system 905 may include one or more hard disk drives as the database 910. In other embodiments, the database 910 is external to the computer system 905 and may be accessed by the computer system 905 using a storage interface 930. The storage interface 930 is any component capable of providing the processor 915 with access to the database 910. The storage interface 930 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 915 with access to the database 910.

The hardware security module (HSM) 935 is configured to generate an asymmetric key pair, a random value master key, an initial unique session key, an initial unique MAC key and a Base derived Key at various instances of a session for encrypting the session data and the MAC. The HSM 935 is an example of the HSM 104 described with reference to FIG. 1. The HSM 935 is further configured to decrypt the encrypted session data and the MAC for content as well as entity authentication. The processor 915 is configured to send the random value master key encrypted using a client public key to the client device 940 via the communication interface 925. Further, the server system 900 is configured to facilitate a UI on the client device 940 using which the user can enter a content known as the session data. The processor 915 is also configured to send the initial unique session key encrypted under the random value master key to the client device 940 to derive a set of unique session keys by the client device 940.

In an embodiment, the communication interface 925 is capable of facilitating operative communication with the client device 940 (e.g., the client device 102) using API calls. The communication may be achieved over a communication network, such as the network 108. The components of the server system 900 provided herein may not be exhaustive, and that the server system 900 may include more or fewer components than that of depicted in FIG. 9. Further, two or more components may be embodied in one single component, and/or one component may be configured using multiple sub-components to achieve the desired functionalities. Some components of the server system 900 may be configured using hardware elements, software elements, firmware elements and/or a combination thereof.

Figure 10:
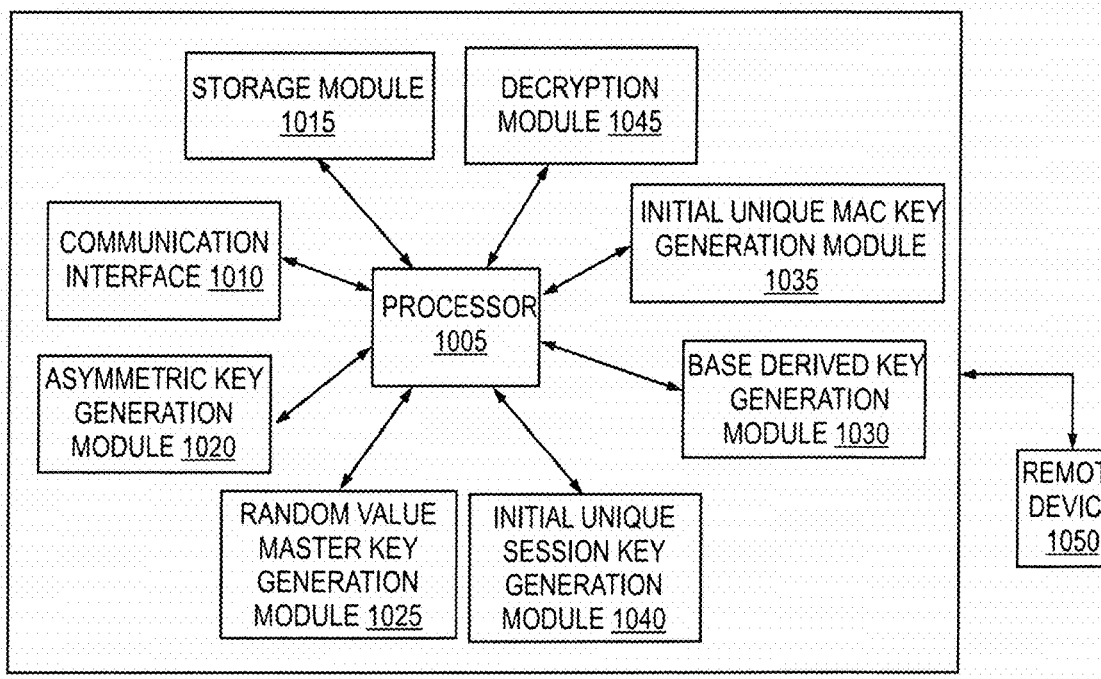
FIG. 10 is a simplified block diagram of a hardware security module, in accordance with one embodiment of the present disclosure.

FIG. 10 is a simplified block diagram of a hardware security module 1000, in accordance with one embodiment of the present disclosure. The HSM 1000 includes at least one processor 1005 communicably coupled to a communication interface 1010, a storage module 1015, an asymmetric key generation module 1020, a random value master key generation module 1025, a Base Derived Key generation module 1030, an initial unique MAC generation module 1035, an initial unique session key generation module 1040 and a decryption module 1045. In at least one embodiment, the HSM 1000 may be accessible to remote devices, such as a remote device 1050 (e.g., the server system 900, the client device 102), through a communication network, such as the network 108.

The processor 1005 is capable of executing the stored machine executable instructions in the storage module 1015 or within the processor 1005 or any storage location accessible to the processor 1005. The asymmetric key generation module 1020 generates a pair of keys i.e., a public key and a private key. The random value master key generation module 1025 generates a predetermined length random value key to be used for encrypting the initial unique session key. The initial unique session key generation module 1040 generates the initial unique session key using a BDK generated by the Base Derived Key generation module 1030. The initial unique MAC generation module 1035 generates the initial unique MAC key using yet another BDK generated by the Base Derived Key generation module 1030. The processor 1005 is configured to include one or more encryption and decryption algorithms to be used by various modules of the HSM 1000. For example, the processor 1005 includes Rivest Shamir Adleman (RSA) encryption algorithm, Diffie-Hellman key agreement algorithm, Advanced Encryption Standard (AES), Data Encryption Standard (DES), Elliptic Curve Cryptography (ECC), El Gamal, Digital Signature Algorithm (DSA), Lagged Fibonacci generators, linear feedback shift registers and the like.

Further, the processor 1005 is configured to perform different encryption and decryption functions such as including, but not limited to, symmetric block ciphers, padding schemes for public-key system, one-way hash functions, message authentication codes, cipher constructions based on hash functions, prime number generation and verification and the like. The processor 1005 is configured to send the public key, the random value master key, the initial unique session key and the initial unique MAC key to the remote device 1050 such as the server system 900 via the communication interface 1010. The decryption module 1045 includes one or more decryption algorithms for decrypting the session data (e.g., the PIN offset) from the encrypted session data received from the remote device 1050 such as the client device 102. The processor 1005 is configured to validate the session data using a session data offset.

In an embodiment, the processor 1005 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In an embodiment, the HSM 1000 may include an input/output module (I/O module) (not shown) configured to receive inputs from and provide outputs to the end-user. For instance, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The storage module 1015 can be any type of storage accessible to the processor 1005. The storage module 1015 may include volatile or non-volatile memories, or a combination thereof. In some non-limiting examples, the storage module 1015 can be four to sixty-four Megabytes (MB) of Dynamic Random Access Memory ("DRAM") or Static Random Access Memory ("SRAM"). In addition, some examples may include supplementary flash memory installed via a PCMCIA slot.

Figure 11:
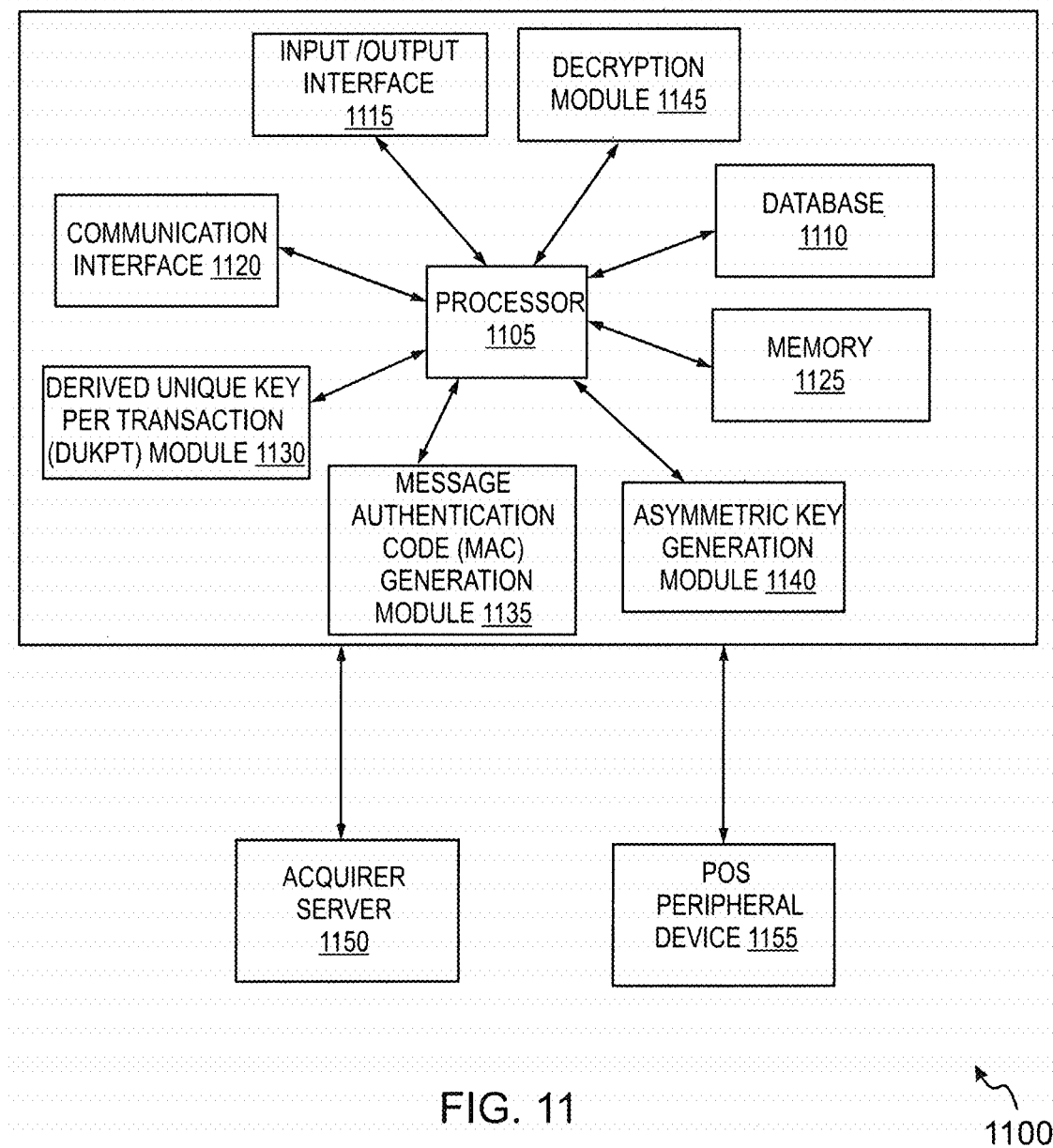
FIG. 11 is a simplified block diagram of a POS terminal configured to derive a set of unique session keys during a payment transaction, in accordance with one embodiment of the present disclosure.

FIG. 11 is a simplified block diagram of a POS terminal 1100 configured to derive a set of unique session keys during a payment transaction, in accordance with one embodiment of the present disclosure. The POS terminal 1100 as explained herein is only one example of the merchant device. In various embodiments, the merchant device can be a merchant mobile phone, a kiosk, a PDA, a merchant facilitated e-commerce website interface running on a computing device, an ATM and the like. The POS terminal 1100 is an example of the POS terminal 602 of FIG. 6 in terms of functionalities and features. The POS terminal 1100 includes at least one processor 1105 communicably coupled to a database 1110, an Input/Output (I/O) interface 1115, a communication interface 1120, a memory 1125, a Derived Unique Key per Transaction (DUKPT) module 1130, a Message authentication code (MAC) generation module 1135 and an asymmetric key generation module 1140. The components of the POS terminal 1100 provided herein may not be exhaustive, and that the POS terminal 1100 may include more or fewer components than that of depicted in FIG. 11. Further, two or more components may be embodied in one single component, and/or one component may be configured using multiple sub-components to achieve the desired functionalities. Some components of the POS terminal 1100 may be configured using hardware elements, software elements, firmware elements and/or a combination thereof.

The I/O interface 1115 is configured to receive inputs from and provide outputs to the end-user (i.e. the merchant and/or the customer) of the POS terminal 1100. For instance, the I/O interface 1115 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1125 can be any type of storage accessible to the processor 1005. For example, the memory 1125 may include volatile or non-volatile memories, or a combination thereof. In some non-limiting examples, the memory 1125 can be four to sixty-four MegaBytes (MB) of Dynamic Random Access Memory ("DRAM") or Static Random Access Memory ("SRAM"). In addition, some examples may include supplementary flash memory installed via a PCMCIA slot.

The database 910 is capable of storing and/or retrieving data, such as, but not limited to, smart card insertions, user/customer information, merchant information, random value master key, initial unique session key (e.g., initial pin encryption key), set of unique session keys derived from the initial unique session key, MAC, initial unique MAC key, the set of unique MAC keys, asymmetric key pair, card swipes, touch-screen key depressions, keypad key depressions, number of dots printed by the slip and roll printers, check read errors, and the like. Such information can be accessed by the processor 1105 using the communication interface 1120 to determine potential future failures and the like.

The POS terminal 1100 is capable of communicating with one or more POS peripheral devices such as the POS peripheral device 1155 and external server system such as an acquirer server 1150 (an example of the acquirer server 604 of FIG. 6) via the communication interface 1120 over a communication network such as the network 108 of FIG. 1. The POS peripheral device 1155 can provide functionality which is used by a consumer at a merchant facility, such as PIN entry, clear text entry, signature capture, and the like. Some non-exhaustive examples of the peripheral device 1155 include barcode scanner, cash drawer, magnetic stripe reader, receipt printer, PIN pad, signature capture device, touchscreen, keyboard, portable data terminal, card reader, customer pole display and the like. In some embodiments, the POS terminal 1100 may be mounted near a cash register at a check-out counter in merchant facility, while the POS peripheral device 1155 may be mounted on the check-out counter such that it is accessible to the users. In this way, both the merchant and the user/customer can interact with similar devices to process the payment transaction.

The communication interface 1120 is further configured to cause display of user interfaces on the POS terminal 1100 using which the user may initiate a payment transaction. In one embodiment, the communication interface 1120 includes a transceiver for wirelessly communicating information to, or receiving information from, the acquirer server 1150 or other suitable display device, and/or another type of remote processing device. In another embodiment, the communication interface 1120 is capable of facilitating operative communication with the remote devices and a cloud server using Application Program Interface (API) calls. The communication may be achieved over a communication network, such as the network 108.

The processor 1105 is capable of sending the payment transaction request received from the end-user via the communication interface 1120 to the acquirer server 1150 for processing the payment transaction. For example, the processor 1105 is configured to send the PIN block encrypted using the unique PIN key (e.g., PIN_KEY_T of FIG. 6) valid per transaction. The unique PIN key is derived using the DUKPT module 1130. The asymmetric key generation module 1140 is configured to generate an asymmetric key pair to be used during receipt of the random value master key automatically and remotely from the acquirer server 1150. The processor 1105 is further configured to generate MAC using the MAC generation module 1135 and encrypt the MAC under a unique MAC key derived using the DUKPT module 1130. The processor 1105 sends the encrypted MAC along with the encrypted PIN block to the acquirer server 1150 via the communication interface 1120. The processor 1105 can access the database 1110 to retrieve the corresponding initial unique session key or the initial unique MAC key for use in deriving the set of the unique keys.

Additionally, the POS terminal 1100 can include an operating system and various software applications that can provide various functionality to the POS terminal 1100. For example, in some embodiments, the POS terminal 1100 is addressable with an Internet protocol and includes a browser application. In such embodiments, the processor 1005 includes software adapted to support such functionality. In some embodiments, the processor 1105 executes software to support network management. In particular, this capacity allows software to be downloaded to a plurality of such systems to provide new applications such as application for enabling session data encryption using DUKPT and/or updates to existing applications. The operating system and software application upgrades are distributed and maintained through communication to the POS terminal 1100 over the communication network 108. For example, existing POS terminals may be adapted to download a new DUKPT module such as the DUKPT module 1130 of the POS terminal 1100 that supports new functionalities for enabling DUKPT based pin encryption and DUKPT based MAC encryption. Further, based on the type of the session data, the DUKPT architecture may differ and those too may be downloaded to the existing POS terminals.

Figure 12:
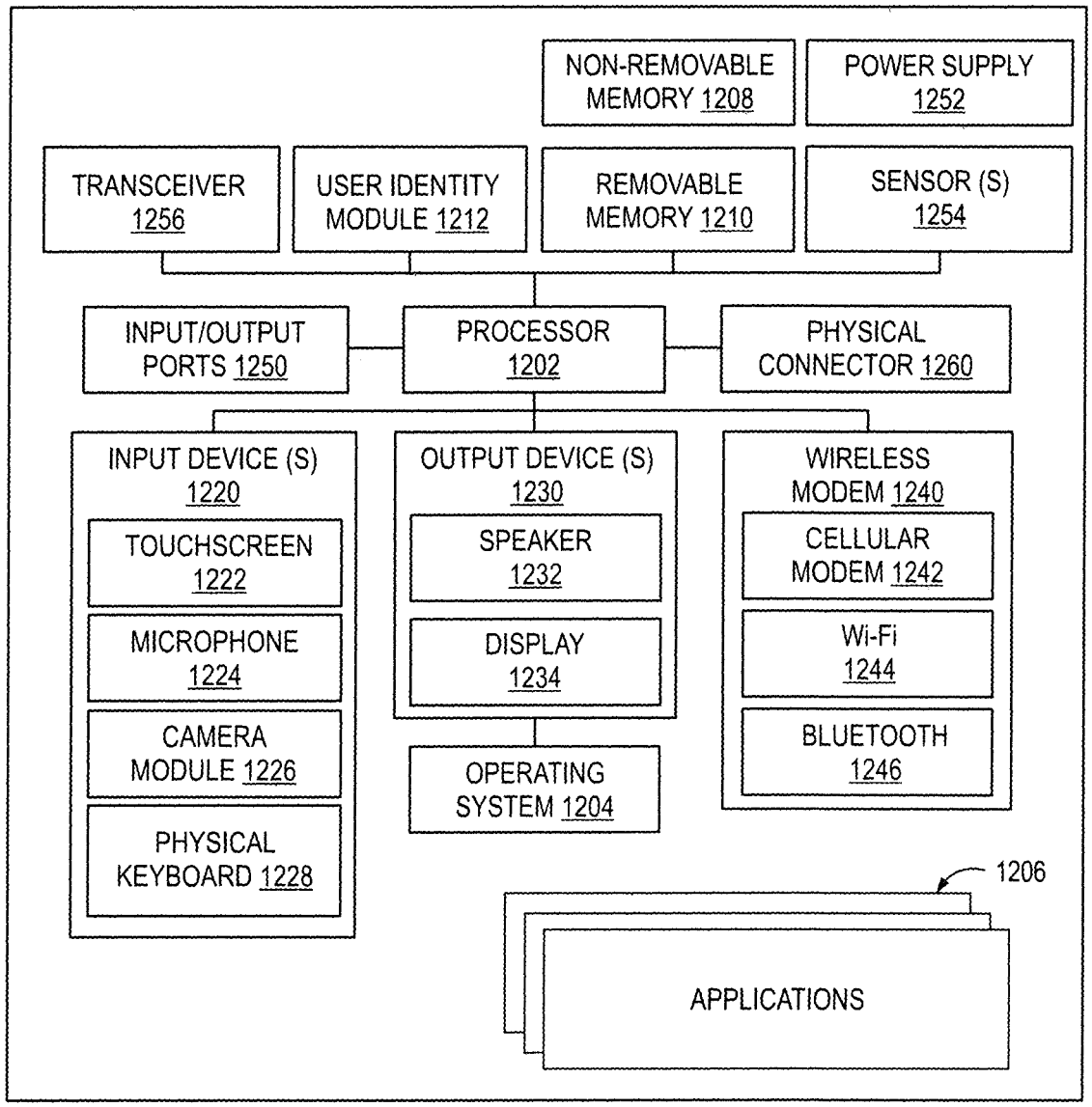
FIG. 12 shows simplified block diagram of a client device capable of implementing at least some embodiments of the present disclosure.

FIG. 12 shows simplified block diagram of a client device 1200 capable of implementing at least some embodiments of the present disclosure. For example, the client device 1200 may correspond to the client device 940 (e.g., the client device 102 of FIG. 1) of FIG. 9. The client device 1200 is depicted to include one or more applications 1206.

It should be understood that the client device 1200 as illustrated and hereinafter described is merely illustrative of one type of device and should not be taken to limit the scope of the embodiments. As such, it should be appreciated that at least some of the components described below in connection with that the client device 1200 may be optional and thus in an example embodiment may include more, less or different components than those described in connection with the example embodiment of the FIG. 12. As such, among other examples, that the client device 1200 could be any of a mobile electronic device, for example, ATMs, kiosks, cellular phones, tablet computers, laptops, mobile computers, personal digital assistants (PDAs), mobile televisions, mobile digital assistants, or any combination of the aforementioned, and other types of communication or multimedia devices.

The illustrated client device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the client device 1200 and support for one or more applications programs (see, the applications 1206), that implement one or more of the innovative features described herein. The applications 1206 may include payment based application and/or any common mobile computing applications (e.g., telephony applications, email applications, calendars, contact managers, web browsers, messaging applications) or any other computing application.

The illustrated client device 1200 includes one or more memory components, for example, a non-removable memory 1208 and/or a removable memory 1210. The non-removable memory 1208 and/or the removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The client device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The client device 1200 can support one or more input devices 1220 and one or more output devices 1230. The input devices 1220 and the output devices 1230 configure the input/output (I/O) module for the client device 1200. Examples of the input devices 1220 may include, but are not limited to, a touch screen/a display screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the client device 1200 and a public switched telephone network (PSTN). The wireless modem 1240 may in at least one example embodiment configure the communication module of the client device 1200.

The client device 1200 can further include one or more input/output ports 1250, a power supply 1252, one or more sensors 1254 for example, an accelerometer, a gyroscope, a compass, or an infrared proximity sensor for detecting the orientation or motion of the client device 1200, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

The disclosed method with reference to FIGS. 7 and 8, or one or more operations of the methods 700 and 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 900 and its various components such as the computer system 905 and the database 910 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a client public key being part of a client asymmetric key pair from a client device;
sending, by the server system, a server public key being part of a server asymmetric key pair to the client device;
generating, by the server system, a random value master key;
sending, by the server system, the random value master key encrypted using the client public key being part of the client asymmetric key pair to the client device;
generating, by the server system, an initial unique session key, wherein generating the initial unique session key comprises:
generating a Base Derived Key (BDK) by a Hardware Security Module (HSM) associated with the server system;
receiving a Key Serial Number (KSN) associated with the client device, wherein the KSN at least comprises a session counter set to zero; and
generating the initial unique session key from the BDK and the KSN; and
sending, by the server system, the initial unique session key encrypted under the random value master key to the client device to derive a set of unique session keys by the client device, wherein a unique session key from the set of the unique session keys is used by the client device to encrypt a session data for transmission to the server system per session.

2. The method as claimed in claim 1, wherein a message authentication code (MAC) encrypted using a unique MAC key is sent to the server system along with the session data encrypted under the unique session key, the unique MAC key selected from a set of unique MAC keys derived by the client device from an initial unique MAC key generated by the server system.

3. The method as claimed in claim 2, wherein the set of unique MAC keys is derived from the initial unique MAC key based on a derived unique key per session.

4. The method as claimed in claim 2, wherein the unique MAC key is validated by the server system and wherein upon successful validation of the unique MAC key, the session data from the unique session key is decrypted.

5. The method as claimed in claim 1, further comprising receiving a public key being part of an asymmetric key pair, the asymmetric key pair belonging to a trusted security model, wherein the trusted security model is configured to:
send the public key being part of the asymmetric key pair to the client device,
certify the client public key by signing with a private key being part of the asymmetric key pair, and
certify the server public key by signing with the private key being part of the asymmetric key pair.

6. The method as claimed in claim 1, wherein the KSN and the initial unique session key are used by the client device to derive the set of the unique session keys, a unique session key from the set of unique session keys generated at least by incrementing the session counter of the KSN per session and wherein the initial unique session key is deleted after derivation of the set of unique session keys.

7. The method as claimed in claim 6, wherein the incremented session counter of the KSN is sent to the server system along with the session data encrypted under the unique session key for decryption of the session data from the unique session key.

8. The method as claimed in claim 1, wherein sending the random value master key encrypted using the client public key being part of the client asymmetric key pair to the client device further comprises:
certifying the encrypted random value master key by signing using a server private key being part of the server asymmetric key pair, wherein the encrypted random value master key is verified by the client device using the server public key being part of the server asymmetric key pair and wherein the encrypted random value master key is decrypted by the client device using a client private key being part of the client asymmetric key pair.

9. The method as claimed in claim 1, wherein the server system is one of a payment server, an acquirer server and an issuer server of a payment network and wherein the session data is one of a Personal Identification Number (PIN) of a payment card, a login ID, a password, a Card Verification Value (CVV) and a payment related data.

10. A server system, the server system comprising:
a communication interface configured to:
receive a client public key being part of a client asymmetric key pair from a client device, and
send a server public key being part of a server asymmetric key pair to the client device;
a memory comprising executable instructions;
a hardware security module (HSM) configured to:
generate a random value master key, and
generate an initial unique session key, wherein for generating the initial unique session key, the server system is further caused to:
generate a Base Derived Key (BDK) by the Hardware Security Module (HSM) associated with the server system;
receive a Key Serial Number (KSN) associated with the client device, wherein the KSN at least comprises a session counter set to zero; and
generate the initial unique session key from the BDK and the KSN; and
a processor communicably coupled to the communication interface, the processor configured to execute the instructions to cause the server system to at least:
send the random value master key encrypted using the client public key being part of the client asymmetric key pair to the client device, and send the initial unique session key encrypted under the random value master key to the client device to derive a set of unique session keys by the client device, wherein a unique session key from the set of the unique session keys is used by the client device to encrypt a session data for transmission to the server system per session.

11. The server system as claimed in claim 10, wherein a message authentication code (MAC) encrypted using a unique MAC key is sent to the server system along with the session data encrypted under the unique session key, the unique MAC key selected from a set of unique MAC keys derived by the client device from an initial unique MAC key generated by the server system.

12. The server system as claimed in claim 11, wherein the set of unique MAC keys is derived from the initial unique MAC key based on a unique derived key per session.

13. The server system as claimed in claim 11, wherein the unique MAC key is validated by the server system and wherein upon successful validation of the unique MAC key, the session data from the unique session key is decrypted.

14. The server system as claimed in claim 10, the server system is further caused to receive a public key being part of an asymmetric key pair, the asymmetric key pair belonging to a trusted security model, wherein the trusted security model is configured to:
send the public key being part of the asymmetric key pair to the client device;
certify the client public key by signing with a private key being part of the asymmetric key pair; and
certify the server public key by signing with the private key being part of the asymmetric key pair.

15. The server system as claimed in claim 10, wherein the KSN and the initial unique session key are used by the client device to derive the set of the unique session keys, a unique session key from the set of unique session keys generated at least by incrementing the session counter of the KSN per session and wherein the initial unique session key is deleted after derivation of the set of unique session keys.

16. The server system as claimed in claim 10, wherein for sending the random value master key encrypted using a client public key being part of the client asymmetric key pair to the client device, the server system is further caused to:
certify the encrypted random value master key by signing using a server private key being part of the server asymmetric key pair wherein the encrypted random value master key is verified by the client device using the server public key being part of the server asymmetric key pair and wherein the encrypted random value master key is decrypted by the client device using a client private key being part of the client asymmetric key pair.

17. A computer-implemented method, comprising:
generating, by a server system, an initial unique MAC key using a Key Serial Number (KSN) of a client device and a Base Derived Key (BDK) generated by a Hardware Security Module (HSM) associated with the server system;
receiving, by the server system, a session data encrypted under a unique session key, a KSN with an incremented session counter and a Message Authentication Code (MAC) encrypted using a unique MAC key valid for a current session, wherein the unique MAC key is selected from a set of unique MAC keys derived by the client device from the initial unique MAC key received from the server system;
validating, by the server system, the unique MAC key using the KSN with the incremented session counter and the BDK; and
upon successful validation of the unique MAC key, decrypting, by the server system, the session data from the unique session key.

18. The method as claimed in claim 17, wherein the initial unique MAC key is generated using the KSN with the session counter set to zero.

\* \* \* \* \*